(12) United States Patent
Bisson-Krol et al.

(10) Patent No.: US 12,242,954 B2
(45) Date of Patent: Mar. 4, 2025

(54) INTERACTIVE MACHINE LEARNING

(71) Applicant: Kinaxis Inc., Ottawa (CA)

(72) Inventors: Chantal Bisson-Krol, Kanata (CA); Zhen Lin, Kanata (CA); Ishan Amlekar, Ottawa (CA); Kevin Shen, Ottawa (CA); Seyednaser Nourashrafeddin, Ottawa (CA); Sebastien Ouellet, Ottawa (CA)

(73) Assignee: Kinaxis Inc., Ottawa (CA)

( * ) Notice: Subject to any disclaimer, the term of this patent is extended or adjusted under 35 U.S.C. 154(b) by 734 days.

(21) Appl. No.: 16/699,010

(22) Filed: Nov. 28, 2019

(65) Prior Publication Data

US 2021/0110299 A1    Apr. 15, 2021

Related U.S. Application Data

(63) Continuation-in-part of application No. 16/697,620, filed on Nov. 27, 2019, now Pat. No. 12,154,013.

(60) Provisional application No. 62/915,076, filed on Oct. 15, 2019.

(51) Int. Cl.
    *G06N 3/08*        (2023.01)
    *G06F 18/23213*    (2023.01)
    *G06N 3/10*        (2006.01)
    *G06N 20/00*       (2019.01)

(52) U.S. Cl.
    CPC ......... *G06N 3/08* (2013.01); *G06F 18/23213* (2023.01); *G06N 3/105* (2013.01); *G06N 20/00* (2019.01)

(58) Field of Classification Search
    None
    See application file for complete search history.

(56) References Cited

U.S. PATENT DOCUMENTS

| 7,257,513 | B2  | 8/2007  | Lilly |
| 7,792,353 | B2* | 9/2010  | Forman .................. G06N 20/00 382/224 |
| 9,785,951 | B1  | 10/2017 | Coleman et al. |
| 10,002,329 | B2 | 6/2018  | Mehanna et al. |
| 10,102,476 | B2 | 10/2018 | Caraviello et al. |
| 10,192,243 | B1 | 1/2019  | Genc-Kaya et al. |
| 10,255,550 | B1 | 4/2019  | Simkoff et al. |

(Continued)

FOREIGN PATENT DOCUMENTS

| CA | 3057521 A1    | 9/2018  |
| JP | H11316763 A1  | 11/1999 |

(Continued)

OTHER PUBLICATIONS

Hu K, Qi K, Yang S, Shen S, Cheng X, Wu H, Zheng J, McClure S, Yu T. Identifying the "Ghost City" of domain topics in a keyword semantic space combining citations. Scientometrics. Mar. 2018;114(3):1141-57. (Year: 2018).*

(Continued)

*Primary Examiner* — Vincent Gonzales
(74) *Attorney, Agent, or Firm* — Borden Ladner Gervais LLP

(57) ABSTRACT

A computer-implemented method of interactive machine learning in which a user is provided with predicted results from a trained machine learning model. The user can take the predicted results and adjust the predicted data to retrain the model.

21 Claims, 17 Drawing Sheets

(56) References Cited

U.S. PATENT DOCUMENTS

| | | |
|---|---|---|
| 10,402,788 B2 | 9/2019 | Morrow et al. |
| 11,526,899 B2 | 12/2022 | Ouellet et al. |
| 11,537,825 B2 | 12/2022 | Ouellet et al. |
| 2010/0088344 A1 | 4/2010 | Treat et al. |
| 2010/0138273 A1 | 6/2010 | Bateni et al. |
| 2012/0303411 A1 | 11/2012 | Chen et al. |
| 2012/0303412 A1 | 11/2012 | Etzioni et al. |
| 2012/0311637 A1* | 12/2012 | Anthru ............ H04N 21/41265 725/44 |
| 2013/0166350 A1 | 6/2013 | Willemain et al. |
| 2014/0122401 A1 | 5/2014 | Collica |
| 2014/0137067 A1 | 5/2014 | Duff |
| 2014/0156346 A1 | 6/2014 | Cai |
| 2014/0236875 A1 | 8/2014 | Phillipps et al. |
| 2014/0358825 A1 | 12/2014 | Phillipps et al. |
| 2014/0358828 A1 | 12/2014 | Phillipps et al. |
| 2015/0019204 A1 | 1/2015 | Simard et al. |
| 2015/0356774 A1 | 12/2015 | Gal et al. |
| 2015/0379072 A1 | 12/2015 | Dirac et al. |
| 2015/0379429 A1 | 12/2015 | Lee et al. |
| 2016/0078022 A1* | 3/2016 | Lisuk .................. G06N 20/00 706/12 |
| 2016/0092519 A1 | 3/2016 | Srivastava et al. |
| 2016/0171682 A1 | 6/2016 | Abedini et al. |
| 2016/0260052 A1 | 9/2016 | Ray et al. |
| 2016/0358099 A1 | 12/2016 | Sturlaugson et al. |
| 2017/0032279 A1 | 2/2017 | Miserendino et al. |
| 2017/0061329 A1 | 3/2017 | Kobayashi et al. |
| 2017/0124487 A1 | 5/2017 | Szeto et al. |
| 2017/0270484 A1 | 9/2017 | Cengiz et al. |
| 2017/0308976 A1 | 10/2017 | Eidelman et al. |
| 2017/0315523 A1 | 11/2017 | Cross et al. |
| 2018/0047071 A1 | 2/2018 | Hsu et al. |
| 2018/0053116 A1 | 2/2018 | Cai et al. |
| 2018/0240013 A1 | 8/2018 | Strope et al. |
| 2018/0247227 A1 | 8/2018 | Holtham |
| 2018/0300576 A1 | 10/2018 | Dalyac et al. |
| 2018/0308051 A1 | 10/2018 | Nemati et al. |
| 2018/0373208 A1 | 12/2018 | Wee et al. |
| 2018/0374109 A1 | 12/2018 | Scarpati et al. |
| 2019/0018823 A1 | 1/2019 | Yabe et al. |
| 2019/0102693 A1 | 4/2019 | Yates et al. |
| 2019/0108417 A1 | 4/2019 | Talagala et al. |
| 2019/0130425 A1 | 5/2019 | Lei et al. |
| 2019/0147350 A1 | 5/2019 | Bai et al. |
| 2019/0156357 A1 | 5/2019 | Palinginis et al. |
| 2019/0156485 A1 | 5/2019 | Pfeiffer |
| 2019/0228590 A1 | 7/2019 | Kaifosh et al. |
| 2019/0250891 A1 | 8/2019 | Kumar et al. |
| 2019/0272557 A1 | 9/2019 | Smith et al. |
| 2020/0005340 A1 | 1/2020 | T. |
| 2020/0042896 A1 | 2/2020 | Ko et al. |
| 2020/0065424 A1 | 2/2020 | Ananthapur Bache et al. |
| 2020/0074402 A1 | 3/2020 | Adato et al. |
| 2020/0090009 A1 | 3/2020 | Arora et al. |
| 2020/0097709 A1 | 3/2020 | Huang et al. |
| 2020/0098055 A1 | 3/2020 | O'Hara et al. |
| 2020/0111109 A1 | 4/2020 | Lei et al. |
| 2020/0130425 A1 | 4/2020 | Sorrentino et al. |
| 2020/0134641 A1 | 4/2020 | Morgan et al. |
| 2020/0134642 A1 | 4/2020 | Morgan et al. |
| 2020/0184494 A1 | 6/2020 | Joseph et al. |
| 2020/0191594 A1 | 6/2020 | Watanabe |
| 2020/0210920 A1 | 7/2020 | Joseph et al. |
| 2020/0226504 A1 | 7/2020 | Keng et al. |
| 2020/0250556 A1 | 8/2020 | Nourian et al. |
| 2020/0380541 A1 | 12/2020 | Laing et al. |
| 2021/0110429 A1 | 4/2021 | Keng et al. |
| 2022/0292308 A1 | 9/2022 | Schwiep et al. |
| 2022/0318711 A1 | 10/2022 | Recasens et al. |
| 2022/0382857 A1 | 12/2022 | Liu et al. |
| 2023/0091610 A1 | 3/2023 | Tamazlykar et al. |
| 2023/0401468 A1 | 12/2023 | Venkitaraman et al. |

FOREIGN PATENT DOCUMENTS

| | | |
|---|---|---|
| JP | 2010282483 A | 12/2010 |
| JP | 2014067154 A | 4/2014 |
| JP | 2018147261 A | 9/2018 |
| JP | 2018526732 A | 9/2018 |
| JP | 2018537798 A | 12/2018 |
| WO | 2017135314 A1 | 8/2017 |
| WO | 2019055957 A1 | 3/2019 |

OTHER PUBLICATIONS

Runkler TA. Generation of linguistic membership functions from word vectors. In 2016 IEEE International Conference on Fuzzy Systems (FUZZ-IEEE) Jul. 24, 2016 (pp. 993-999). IEEE. (Year: 2016).*

Du KL. Clustering: A neural network approach. Neural networks. Jan. 1, 2010;23(1):89-107. (Year: 2010).*

PC Review discussion forum, "On scatter chart, how can data points be moved with curser?", posts dated Feb. 8, 2010, available at https://www.pcreview.co.uk/threads/on-scatter-chart-how-can-data-points-be-moved-with-curser.3965453/, accessed Sep. 11, 2023. 1 page. (Year: 2010).*

Sherkat, et al., "Interactive Document Clustering Revisited: A Visual Analytics Approach". IUI 2018: 23rd International Conference on Intelligent User Interfaces, Mar. 11, 2018 (Nov. 3, 2018), pp. 281-292, ISSN DOI:10.1145/3172944.3 | 72964 [online] [retrieved on Dec. 10, 2020 (Oct. 12, 2020)]. Retrieved from the Internet: <https://dl.acm.org/doi/10. || 45/3172944.3172964>.

International Search Report from related PCT International Application No. PCT/CA2020/051379, dated Jan. 4, 2021.

International Search Report from related PCT International Application No. PCT/CA2020/051378, dated Dec. 16, 2020.

International Search Report from related PCT International Application No. PCT/CA2020/051347, dated Jan. 8, 2021.

International Preliminary Report on Patentability from related PCT International Application No. PCT/CA2020/051378, dated Jan. 25, 2022, pp. 1-5.

Badam et al., "TimeFork: Interactive Prediction of Time Series". CHI '16: Proceedings of the 2016 CHI Conference on Human Factors in Computing Systems, May 7, 2016 (Jul. 5, 2016), pp. 5409-5420, ISSN https://doi.org/10.1145/2858036.2858150 [online].

International Patent Application No. PCT/CA2020/051379, International Preliminary Report on Patentability dated Jan. 5, 2022.

U.S. Appl. No. 16/697,620, Office Action dated Apr. 29, 2022.

U.S. Appl. No. 16/697,620, Final office action dated Feb. 9, 2023.

Canadian Patent Application No. 3,154,982 Office Action dated Jun. 29, 2023.

U.S. Appl. No. 16/599,143, Notice of Allowance dated Aug. 10, 2022.

U.S. Appl. No. 16/697,620, Advisory Action dated Apr. 21, 2023.

U.S. Appl. No. 16/697,620, Non-Final office Action dated Jul. 31, 2023.

U.S. Appl. No. 16/848,266, Final Office Action dated Apr. 14, 2022.

U.S. Appl. No. 16/848,266, Non-Final Office Action dated Sep. 29, 2021.

U.S. Appl. No. 16/848,266, Notice of Allowance dated May 3, 2023.

U.S. Appl. No. 17/987,401, Notice of Allowance dated Jun. 1, 2023.

U.S. Appl. No. 17/993,952, Final office action dated Aug. 3, 2023.

U.S. Appl. No. 18/071,802, Notice of Allowance dated Jul. 24, 2023.

U.S. Appl. No. 16/599,143, Advisory Action dated Jun. 9, 2022.

U.S. Appl. No. 16/599,143, Final Office Action dated Feb. 3, 2022.

U.S. Appl. No. 16/599,143, Non-Final Office Action dated Aug. 18, 2021.

U.S. Appl. No. 16/837,182, Final Office Action dated Apr. 27, 2022.

U.S. Appl. No. 16/837,182, Non-Final Office Action dated Sep. 16, 2021.

U.S. Appl. No. 16/848,266, Non Final office Action dated Oct. 13, 2022.

European Patent Application No. 20877770.6, Extended European Search Report dated Nov. 21, 2023.

(56) References Cited

OTHER PUBLICATIONS

European Patent Application No. 20876015, Extended European Search Report dated Sep. 1, 2023.
Japanese Patent Application No. JP2022-521962, Office Action dated Oct. 21, 2022—English Translation available.
U.S. Appl. No. 16/697,620, Office Action dated Jul. 13, 2022.
Yoshizaki et al., "Machine Learning Usage Guide by Practical Learning ," Mynavi Publishing Corporation, Naoki Takiguchi, Sep. 20, 2019, vol. 1 (1), pp. 156-165.
U.S. Appl. No. 18/451,755, Non-Final office Action dated Mar. 14, 2024.
U.S. Appl. No. 16/697,620, Final office Action dated Feb. 1, 2024.
U.S. Appl. No. 16/697,620, Advisory action dated May 3, 2024.
U.S. Appl. No. 17/993,952, Non Final office action dated May 21, 2024.
U.S. Appl. No. 18/461,608, Non -Final office Action dated Apr. 25, 2024.
AWS: "Amazon Machine Learning Developer Guide," Precodata, 2017, pp. 1-146 [Retrieved on Jul. 12, 2024] Retrieved from [https://www.precodata.com/wp-content/uploads/pdf/AWS-MachineLearning.pdf].
Feature Engineering: Explanation, Methods and Examples from Jul. 7, 2020, https://datadrivencompany.de/feature-engineering-methods-and-examples/ [researched on Jul. 10, 2024] 14 pages.
Forecasts: Everyone Needs Them, No One Can Scale Them, from Jul. 6, 2018, https://digitalweltmagazin.de/forecasts-jeder-bedarf-sie-nichter-kann-sie-skalieren/ [researched on Jul. 11, 2024] 09 Pages.
Japanese Patent Application No. 2022-522579, Office Action dated Aug. 14, 2024 (English Translation Available).
U.S. Appl. No. 16/697,620, Notice of Allowance dated Aug. 19, 2024.
Japanese Patent Application No. 2023-007474, Office action mailing date Oct. 3, 2024—English Translation available.
Tanaka, et al., Implementation of Information Exploring Support Enviroment (1) Information Classifying System Based on Self-Organizing Mechanism, Technical Report of IEICE, 1996, vol. 96 (431), pp. 55-62.
U.S. Appl. No. 16/697,620, Notice of Allowance dated Oct. 15, 2024.

* cited by examiner

INTERACTIVE MACHINE LEARNING

CROSS-REFERENCE TO RELATED APPLICATIONS

This application claims the benefit of both U.S. Provisional Patent Application No. 62/915,076, filed Oct. 15, 2019; and U.S. application Ser. No. 16/697,620, filed Nov. 27, 2019—both of which are hereby incorporated by reference herein in their respective entirety.

TECHNICAL FIELD

This disclosure is directed generally to predictions based on machine learning, and more particularly, to systems and methods for user interaction with machine learning predictions.

BACKGROUND

Current attempts at applying machine learning to various industries rarely use direct involvement by the end user. Furthermore, predictions of a machine learning model depend greatly on the quality of the data it is trained on. However, most users consider such a model as a "black box" that they neither understand nor intuitively trust. Furthermore, users do not have any opportunity to see how to directly influence predicted outcomes of machine learning models.

New product introduction is a very large problem in many industries as well as supply chain management and demand forecasting. This problem is universally applicable to any organization that deals with selling or buying products.

In some instances, existing items are grouped based on similarity of meaning using an unsupervised machine learning approach initially. As a new item is introduced, it is automatically either 1) added to the cluster it resembles the most; or 2) when it is completely different from any of the existing items, the machine-learning model creates a separate cluster from the new item. The problem with these partitions obtained from clustering of items is that they may be far from the preference of a user.

BRIEF SUMMARY

Disclosed herein are systems and methods that allow for user interactions to influence machine learning results either by changing input data or by retraining the model. In other words, human feedback is used to re-train the model to improve the accuracy of predictions related to supply chain information.

To allow the user to develop an intuitive trust the machine learning model, the present disclosure provides methods and systems that allow a user to influence the model itself based on user interactions. Such an influence can occur in two ways: 1) changing the information that is used to predict; and 2) retraining the model itself.

The present disclosure provides system and methods that allows a user to move desired items which influence the positions of all items added after it. To implement such a scenario, the model can be retrained after every user interaction to capture user feedback and allow the model to learn from the feedback.

In one aspect, a system comprising: a processor; and a memory storing instructions that, when executed by the processor, configure the system to: pre-process, by a machine learning module, data; select, by the machine learning module, a trained machine learning model; predict, by the machine learning module, a result based on the trained machine learning model; output, by the machine learn module, to a user interface, a prediction for a user; amend, via the user interface, the prediction, by the user, to provide an amended prediction; retrain, by the machine learning module, the trained machine learning model based on data associated with the amended prediction, thereby providing a retrained machine learning model; and predict, by the machine learning module, a new result based on: (i) the data associated with the amended prediction; and (ii) the re-trained machine learning model.

In some embodiments, the user interface can be a graphical user interface. In some embodiments, the results may be output to a device; and the user may amend the prediction by moving one or more objects on a screen of the device.

In some embodiments, the user may amend the prediction by amending a data file associated with the prediction.

In some embodiments, the machine learn model can be selected from the group consisting of K-Means Clustering, Mean-Shift Clustering, Density-Based Spatial Clustering of Applications with Noise (DBSCAN), Expectation-Maximization (EM) Clustering using Gaussian Mixture Models (GMM), Agglomerative Hierarchical Clustering and any combination thereof.

In some embodiments, the instructions can configure the system to: convert, by the machine learning module, a plurality of descriptions of items into a plurality of word vectors, each word vector having a plurality of dimensions; project, by the machine learning module onto a two-dimensional plane of the user interface, the plurality of word vectors; train, by the machine learning module, a neural network within the machine learning module, on the plurality of word vectors and a plurality of sets of two-dimensional coordinates, each set of two-dimensional coordinates associated with a respective word vector; amend, by the user via the user interface, a subset of the plurality of sets of two-dimensional coordinates, to provide a plurality of amended sets of two-dimensional coordinates; and retrain, by the machine learning module, the neural network, on the plurality of amended sets of two-dimensional coordinates.

In another aspect, a computer-implemented method of interactive machine learning, the method comprising: pre-processing, by a machine learning module, data; selecting, by the machine learning module, a trained machine learning model; predicting, by the machine learning module, a result based on the trained machine learning model; outputting, by the machine learning module, to a user interface, a prediction for a user; amending, via the user interface, the prediction, by the user, to provide an amended prediction; retraining, by the machine learning module, the trained machine learning model based on data associated with the amended prediction, thereby providing a retrained machine learning model; and predicting, by the machine learning module, a new result based on: (i) the data associated with the amended prediction; and (ii) the re-trained machine learning model.

In some embodiments, the user interface can be a graphical user interface. In some embodiments, the results may be output to a device; and the user may amend the prediction by moving one or more objects on a screen of the device.

In some embodiments, the user may amend the prediction by amending a data file associated with the prediction.

In some embodiments, the machine learn model can be selected from the group consisting of K-Means Clustering, Mean-Shift Clustering, Density-Based Spatial Clustering of Applications with Noise (DBSCAN), Expectation-Maximization (EM) Clustering using Gaussian Mixture Models (GMM), Agglomerative Hierarchical Clustering and any combination thereof.

In some embodiments, the method may comprise: converting, by the machine learning module, a plurality of descriptions of items into a plurality of word vectors, each word vector having a plurality of dimensions; projecting, by the machine learning module onto a two-dimensional plane of the user interface, the plurality of word vectors; training, by the machine learning module, a neural network within the machine learning module, on the plurality of word vectors and a plurality of sets of two-dimensional coordinates, each set of two-dimensional coordinates associated with a respective word vector; amending, by the user via the user interface, a subset of the plurality of sets of two-dimensional coordinates, to provide a plurality of amended sets of two-dimensional coordinates; and retraining, by the machine learning module, the neural network, on the plurality of amended sets of two-dimensional coordinates.

In another aspect, a non-transitory computer-readable storage medium, the computer-readable storage medium including instructions that when executed by a computer, cause the computer to: pre-process, by a machine learning module, data; select, by the machine learning module, a trained machine learning model; predict, by the machine learning module, a result based on the trained machine learning model; output, by the machine learn module, to a user interface, a prediction for a user; amend, via the user interface, the prediction, by the user, to provide an amended prediction; retrain, by the machine learning module, the trained machine learning model based on data associated with the amended prediction, thereby providing a retrained machine learning model; and predict, by the machine learning module, a new result based on: (i) the data associated with the amended prediction; and (ii) the re-trained machine learning model.

In some embodiments, the user interface can be a graphical user interface. In some embodiments, the results may be output to a device; and the user may amend the prediction by moving one or more objects on a screen of the device.

In some embodiments, the user may amend the prediction by amending a data file associated with the prediction.

In some embodiments, the machine learn model can be selected from the group consisting of K-Means Clustering, Mean-Shift Clustering, Density-Based Spatial Clustering of Applications with Noise (DBSCAN), Expectation-Maximization (EM) Clustering using Gaussian Mixture Models (GMM), Agglomerative Hierarchical Clustering and any combination thereof.

In some embodiments, the instructions may configure the computer to: convert, by the machine learning module, a plurality of descriptions of items into a plurality of word vectors, each word vector having a plurality of dimensions; project, by the machine learning module onto a two-dimensional plane of the user interface, the plurality of word vectors; train, by the machine learning module, a neural network within the machine learning module, on the plurality of word vectors and a plurality of sets of two-dimensional coordinates, each set of two-dimensional coordinates associated with a respective word vector; amend, by the user via the user interface, a subset of the plurality of sets of two-dimensional coordinates, to provide a plurality of amended sets of two-dimensional coordinates; and retrain, by the machine learning module, the neural network, on the plurality of amended sets of two-dimensional coordinates.

The details of one or more embodiments of the subject matter of this specification are set forth in the accompanying drawings and the description below. Other features, aspects, and advantages of the subject matter will become apparent from the description, the drawings, and the claims.

Like reference numbers and designations in the various drawings indicate like elements.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
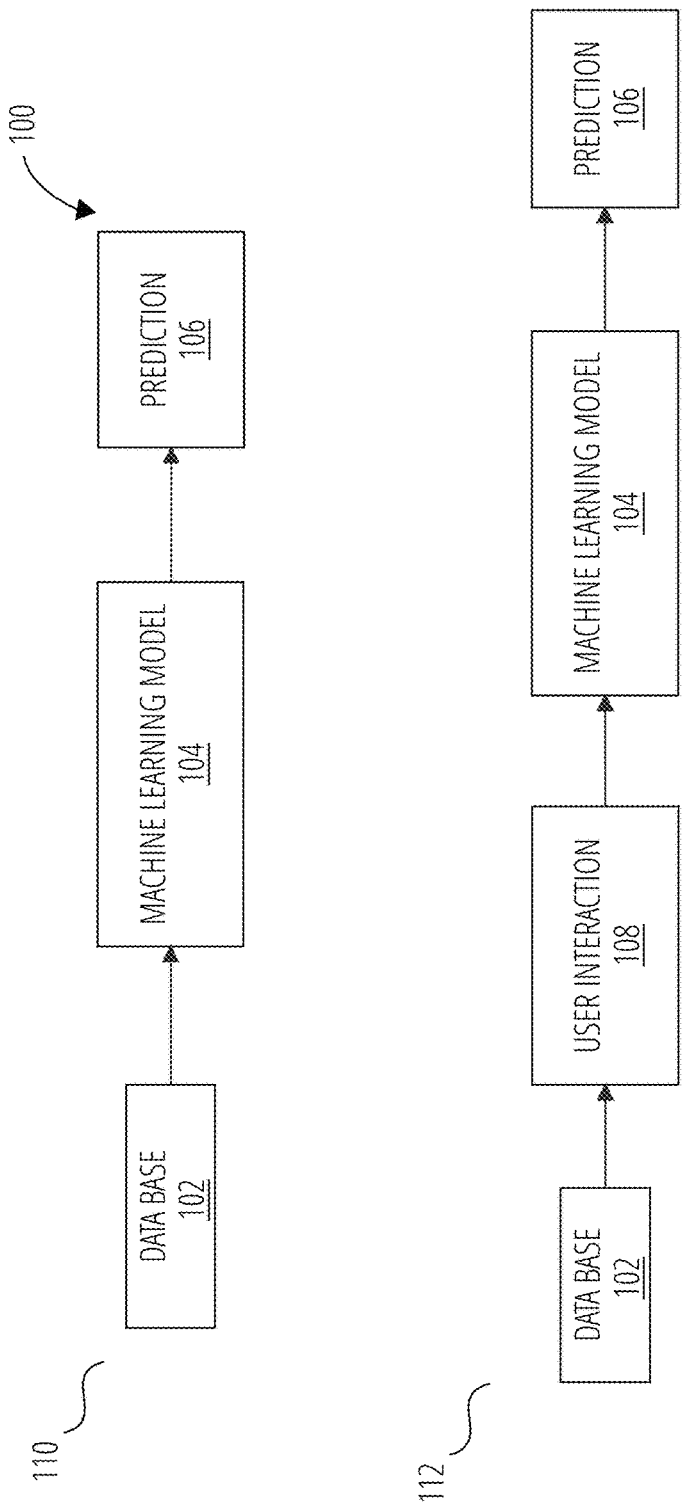
FIG. 1 illustrates an overview in accordance with one embodiment of interactive machine learning.

In the present document, any embodiment or implementation of the present subject matter described herein as serving as an example, instance or illustration, and is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 illustrates an overview 100 in accordance with one embodiment of interactive machine learning.

In FIG. 1, conventional process 110 illustrates a simple overview of conventional machine learning, in which data base 102 is provided to train a machine learning model 104; the trained model the provides a prediction 106.

In FIG. 1, an overview of interactive machine learning 112 illustrates insertion of user interaction 108 in between transmission of data base 102 and machine learning model 104. That is, a user directly intervenes to manipulate data, prior to its use by the machine learning model.

Figure 2:
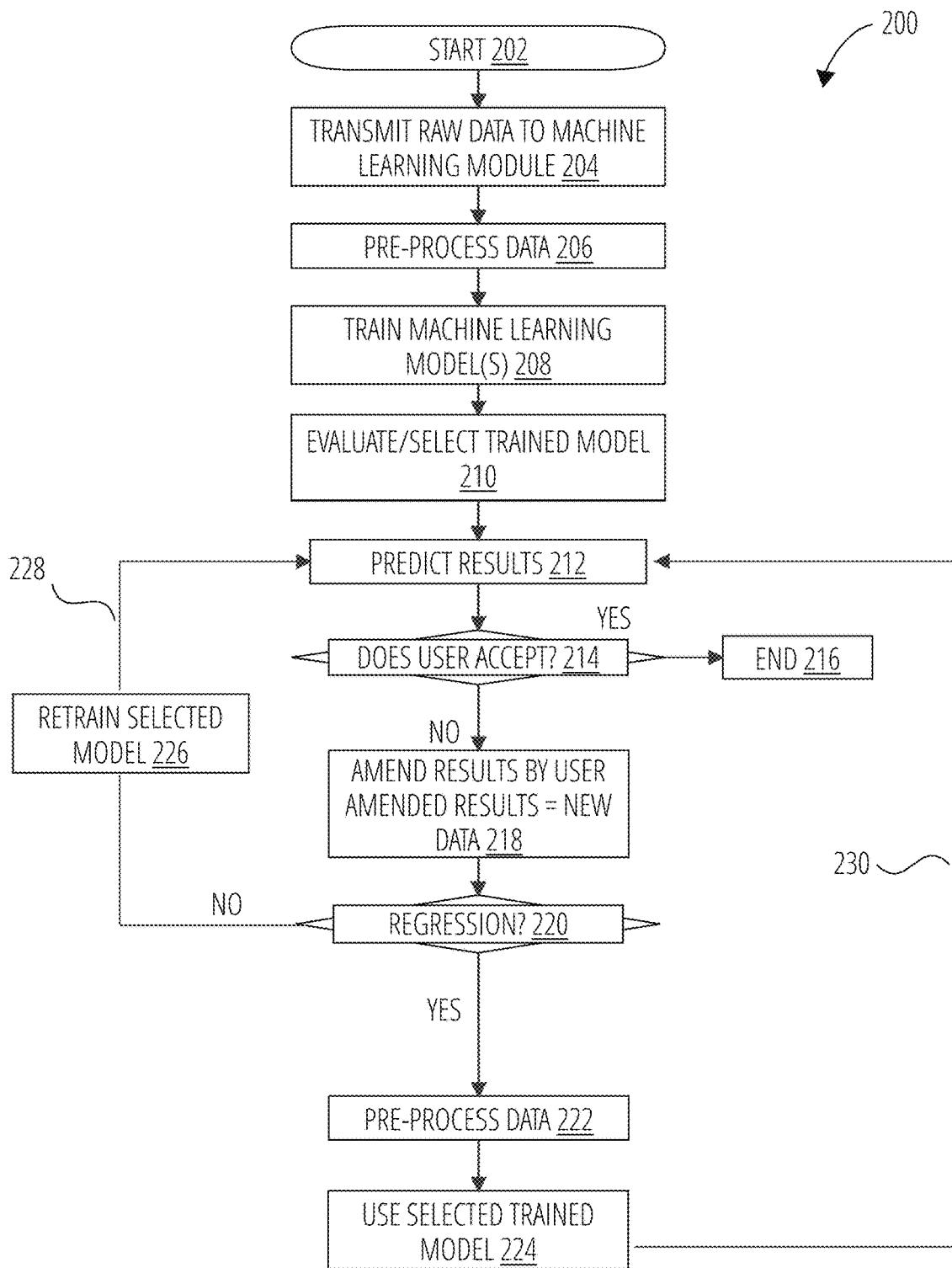
FIG. 2 illustrates a block diagram in accordance with one embodiment of interactive machine learning.

FIG. 2 illustrates a block diagram 200 in accordance with one embodiment of interactive machine learning.

Raw data is first transmitted to a machine learning module at step 204, The data is pre-processed at step 206, after which it is sent to train one or more machine learning models at step 208. Each trained model is evaluated, and a trained model is selected at step 210 to make predictions. The trained model is used predict results at step 212. At this juncture, the results are presented to a user, who has the option to amend the predicted results at step 218. The amended results are then used as new or updated data.

If the machine learning model provides a regression analysis, then the amended results are treated as data that is pre-processed at step 222, Subsequently, at step 224, the pre-processed data is used by the trained model that was selected at step 210, to make a prediction at step 212. The user once again can look at the new prediction and decide on whether to keep the results (at which point, the process ends at step 216), or, continue with loop 230. This loop can be executed as many times as needed until the user is satisfied with the results, and the process ends at step 216.

If the machine learning model does not provide regression analysis (for example, clustering analysis), then the amended results are treated as data that is to be pre-processed at step 206, and step 208 to step 212 are re-executed. If the user is satisfied with the new prediction, then the process ends at step 216. Otherwise, loop 228 can be executed as many times as needed until the user is satisfied with the results, and the process ends at step 216.

Figure 3:
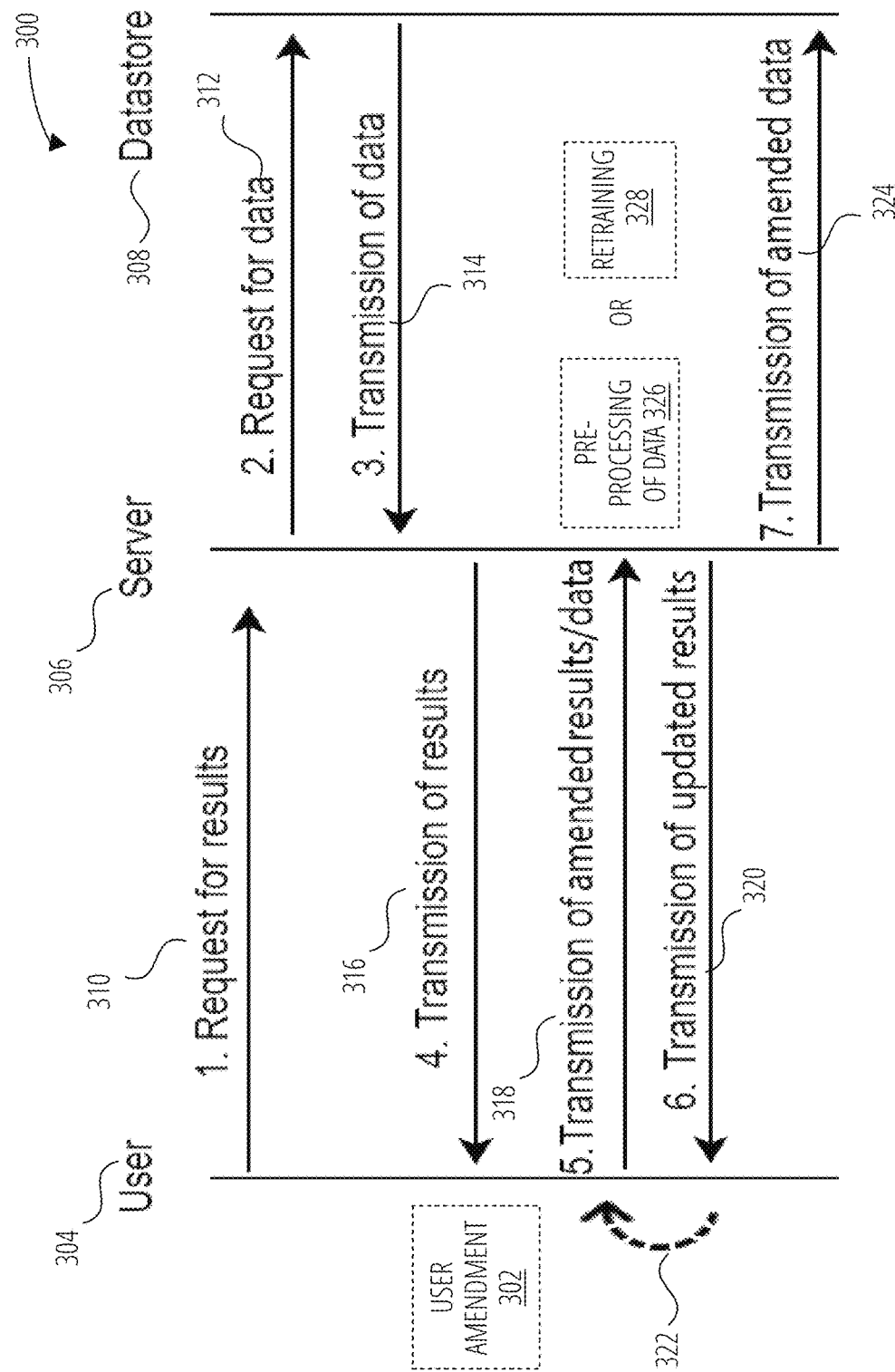
FIG. 3 illustrates a flowchart in accordance with one embodiment of interactive machine learning.

FIG. 3 illustrates a flowchart 300 in accordance with one embodiment of interactive machine learning.

In FIG. 3, a user 304 makes a request for results 310 to a server 306. Based on this initial request, server 306 can compute what is required for the results requested. Server 306 sends a query, or request for data 312 to a datastore 308, which then provides transmission of data 314 to server 306 that hosts a machine learning module. This module pre-processes the data which is fed to a machine learning model that makes a prediction and provides a transmission of results 316 to user 304. who can then modify the results, via user amendment 302.

Pre-processing of data may include transformation, validation, remediation, or any combination thereof, of the data.

Validation of the data simple means to determine whether there are potential errors in the incoming data. For example, validation can include identification of missing data, null data, differences in row counts and data mismatches. In some embodiments, data validation module may use a machine learning algorithm in conjunction with a z-score threshold value to identify anomalous data values.

Data remediation involves remediation or re-calculation of data that is indicative of an error. For example: missing or erroneous values may be replaced using data that is interpolated from an existing value or values, an average of existing data or a mean of existing data. In some embodiments, remediation of data can use a predictive model to replace data that is indicative of error.

Transmission of amended results/data 318 is provided from user 304 to server 306. At this point, pre-processing of data 326 occurs. For example, the amended data is pre-processed (as in step 206 or step 222 in FIG. 2). If the machine learning model provides a regression-type analysis, then pre-processing of data 326 will include re-application of the trained model to make a new or updated prediction (as in loop 230 of FIG. 2). If the machine learning model does not involve a regression analysis (e.g. clustering analysis), then retraining 328 can include steps in loop 228 of FIG. 2, to make a new or updated prediction.

The updated prediction is provided to user 304 by transmission of updated results 320. At this point, user 304 can accept the updated results, or, seek to amend the results via optional loop 322; transmission of amended results/data 318 to server 306 occurs once again, along with pre-processing of data 326, which a further calculation of a new prediction and transmission of updated results 320 back to user 304. Optional loop 322 continues until user 304 is satisfied with the results. The final amended dataset is sent to datastore 308 for storage via transmission of amended data 324.

In some embodiments, user amendment 302 can occur as follows. Predictions transmitted to user 304 can be in any format that includes predicted data (for example, in a spreadsheet or as a dataset in a JSON document). User 304 can consume the predictions. Then, user 304 determines that the predictions are somewhat wrong for one group of items and amends the predictions by amending the file that contains the predicted dataset (for example, by amending a spreadsheet or a JSON document with the amended predictions). User 304 transmits the amended data file to server 306 (for example, a spreadsheet or JSON document through a HTTP request), which accepts it. Server 306 amends the pre-processed dataset with the amended dataset at pre-processing of data 326.

Figure 4:
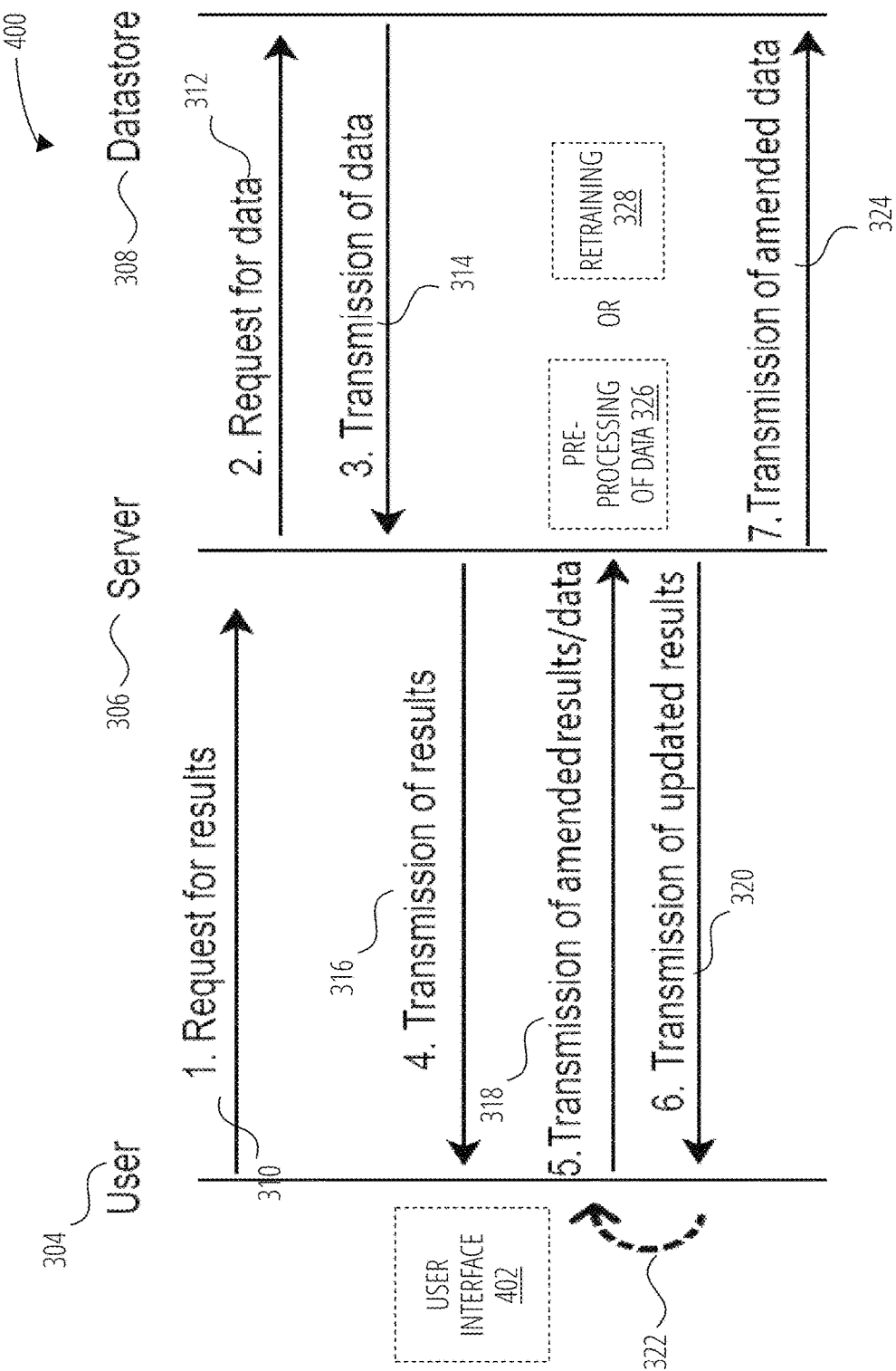
FIG. 4 illustrates a flowchart in accordance with one embodiment of interactive machine learning.

FIG. 4 illustrates a flowchart 400 in accordance with one embodiment of interactive machine learning.

In FIG. 4, a user makes a request for results 310 to a server 306. Based on this initial request, server 306 can compute what is required for the results requested. Server 306 sends a query, or request for data 312 to a datastore 308, which then provides transmission of data 314 to server 306 that hosts a machine learning module. This module pre-processes the data which is fed to a machine learning model that makes a prediction and provides a transmission of results 316 to user 304. who can then modify the results, via user amendment 302.

Transmission of amended results/data 318 is provided from user 304 to server 306. At this point, pre-processing of data 326 occurs. For example, the amended data is pre-processed (as in step 206 or step 222 in FIG. 2). If the machine learning model comprises regression analysis, then pre-processing of data 326 will include re-application of the trained model to make a new or updated prediction (as in loop 230 of FIG. 2). If the machine learning model does not provide regression analysis (e.g. clustering analysis), then retraining 328 can include steps in loop 228 of FIG. 2, to make a new or updated prediction.

The updated prediction is provided to user 304 by transmission of updated results 320. At this point, user 304 can accept the updated results, or, seek to amend the results via optional loop 322; transmission of amended results/data 318 to server 306 occurs once again, along with pre-processing of data 326, which a further calculation of a new prediction and transmission of updated results 320 back to user 304. Optional loop 322 continues until user 304 is satisfied with the results. The final amended dataset is sent to datastore 308 for storage via transmission of amended data 324.

In FIG. 4, rather than directly amending a file containing the predicted data, user interface 402 is used by user 304 to amend the data. User interface 402 can be any type of interface that provides a user to obtain the predicted results, amend, and transmit back to user 304. In some embodiments, user interface 402 is a Graphical User Interface (GUI), in which the results are parsed by the GUI, thereby allowing user 304 to correct/constrain/fix the results, which are then transmitted back to the server 306, followed by further pre-processing of data 326, prior to transmission of a new prediction.

Figure 5:
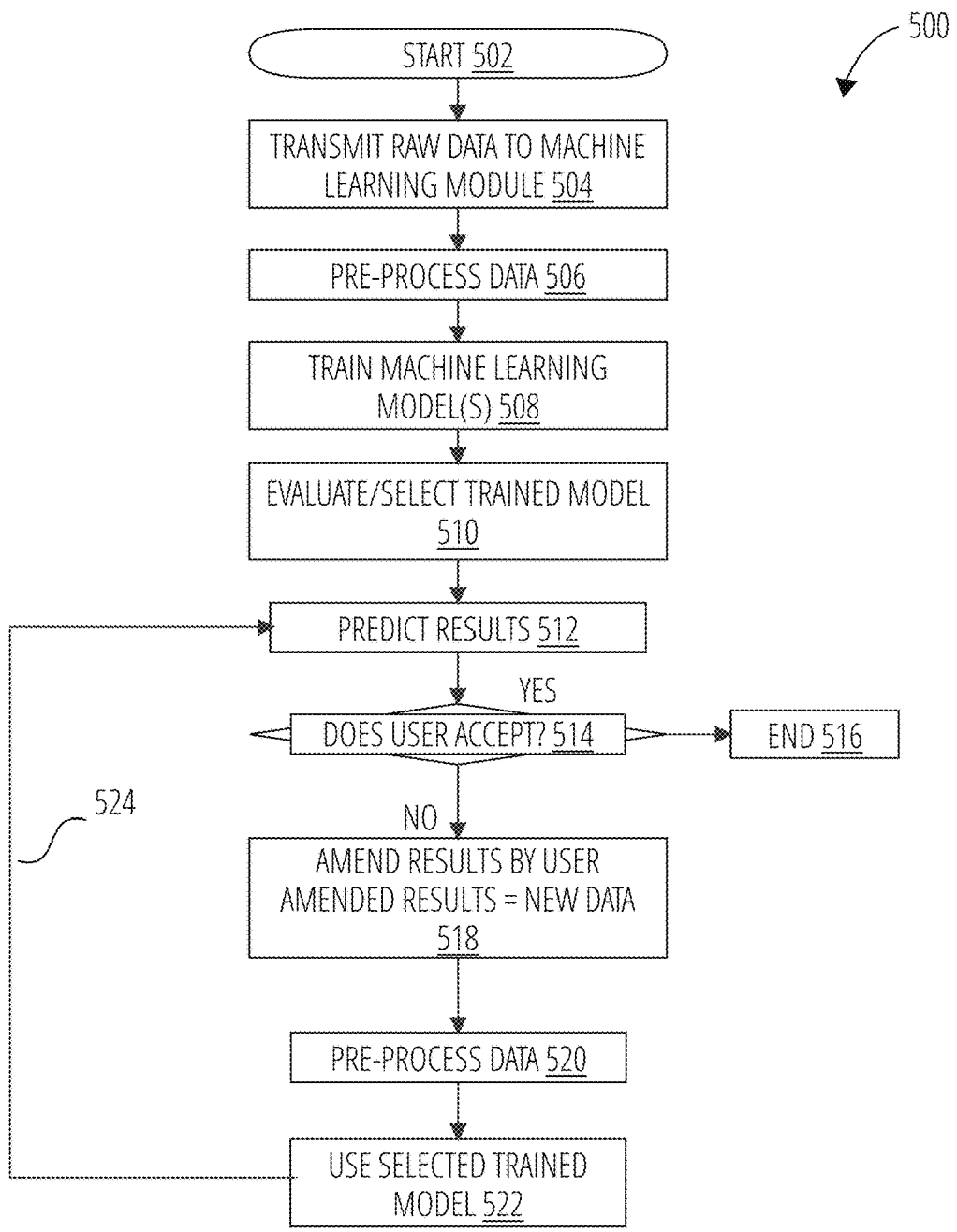
FIG. 5 illustrates a block diagram in accordance with one embodiment of interactive machine learning.

FIG. 5 illustrates a block diagram 500 in accordance with one embodiment of interactive machine learning.

Raw data is first transmitted to a machine learning module at step 504, The data is pre-processed at step 506, after which it is sent to train one or more machine learning models at step 508. Each trained model is evaluated, and a trained model is selected at step 510 to make predictions. The trained model is used predict results at step 512. At this juncture, the results are presented to a user, who has the option to amend the predicted results at step 518. The amended results are then used as new or updated data.

The amended results are treated as data that is pre-processed at step 520, Subsequently, at step 522, the pre-processed data is used by the trained model that was selected at step 510, to make a prediction at step 512. The user once again can look at the new prediction and decide on whether to keep the results (at which point, the process ends at step 516), or, once again, continue loop 524, which can be executed as many times as needed until the user is satisfied with the results, and the process ends at step 516.

Embodiment: Machine Learning with a User-Based Constraint

Figure 6:
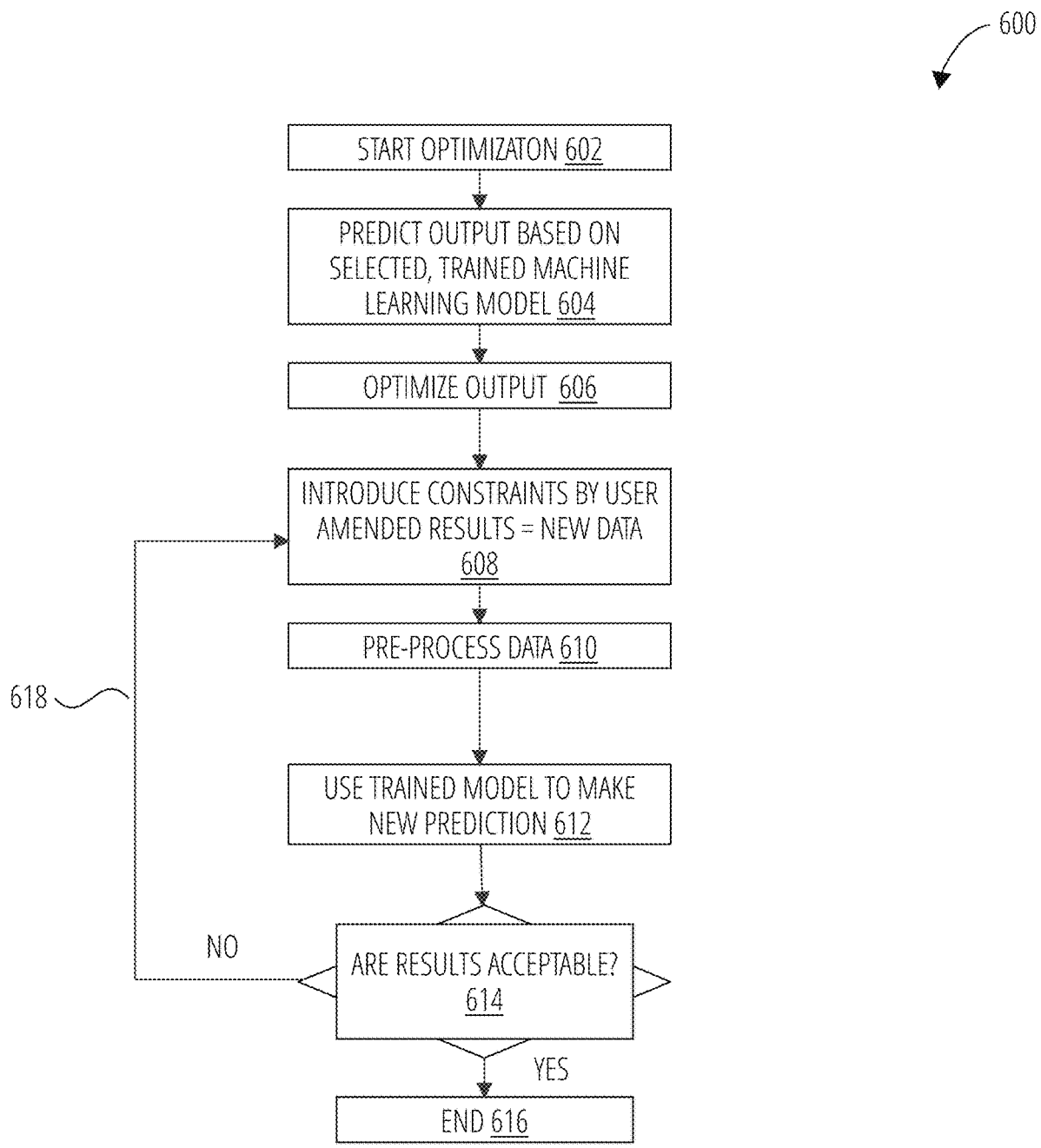
FIG. 6 illustrates a flowchart in accordance with one embodiment of interactive machine learning.

FIG. 6 illustrates a flowchart 600 in accordance with one embodiment of interactive machine learning. In FIG. 6, interactive machine learning is used for optimization with a user-based constraint, in a machine learning model.

A first step is step 604, in which a prediction of an output is made using a machine learning model, that has been previously trained and selected. The output can then be optimized at step 606 (using an optimization algorithm) with respect to one or more subsets of the data. At step 608, a user introduces constraints into the one or more subsets, which results in one or more constraints on the original data set. This amended result is treated as a new data set, which is then pre-processed at step 610, prior to being processed by the same trained model (at step 604) to make a new prediction at step 612, thus resulting in a new machine learning model prediction at step 612. At this stage, the user may accept the results, and thus end the program (at step 616), or decide to introduce further constraints and execute loop 618 again, until satisfactory results are obtained at step 616

An embodiment using flowchart 600 is shown in FIG. 7-FIG. 10.

Embodiment: Interactive Machine Learning in Promotion Optimization

Promotion optimization is a very large problem in many industries as well as supply chain management and demand forecasting.

Machine learning can be used to optimize the dates of promotions to maximize sales of products. In a single run, an algorithm goes through multiple (e.g. hundreds, thousands, etc.) optimization iterations. In each iteration, the promotion dates are moved to different dates and a prediction is run and the resulting sales is recorded. Eventually, a global maximum in the sales is reached and the promotion dates are returned. The original and optimized results are then displayed to the user. The user has the choice of moving the promotions and "anchoring" them for future runs. Once a promotion is "anchored", it does not get moved or optimized. This is to simulate a constraint in the business world. For example, a company has already pre-scheduled a promotion on a certain date and cannot move it. This example demonstrates interactive machine learning by allowing user feedback to influence future runs of the algorithm.

In such an embodiment, a machine learning model is used, along with a module for optimization and a user interface for user feedback. Examples include LightGBM (forecasting/prediction algorithm), DiscreteOnePlusOne (generic algorithm from Facebook's Nevergrad library for optimization), Plotly Dash (for the user interface).

Experimental Details (Promotion Optimization)

In a first phase, it is possible to increase sales by optimizing promotions using an appropriate optimization algorithm. By experimenting with as many algorithms as possible on a selected subset of products, an optimum model can be found.

First, a publicly-available data set was used. Second, a machine-learning model was built to provide a prediction based on the data. Then, an exhaustive search was conducted on dozens of optimization algorithms from Facebook's Nevergrad library. A set of optimal model hyper-parameters was found, as well as the best optimization algorithm. This resulted in sales being boosted by a significant amount (between 5-15% for a single optimization).

At first, a forecast/prediction model called LightGBM was selected to fit on the dataset. LightGBM was chosen based on past experiences as it has performed very well for fitting other data. The dates of the promotions were treated as features of the model (input). A goal was to move the promotions to dates that would boost sales by the most (i.e. find the optimal promotions dates).

Products in the dataset that had a rich amount of transactions and a good fit for the model were selected. This is important because if a model does not fit well from the beginning, any optimization attempts may be inaccurate. Next, an exhaustive search for the best algorithm in Facebook AI's Nevergrad library was performed. The Nevergrad library is an open sourced gradient free optimization platform. That is, the total number of searches amounted to (# of algorithms in Nevegrad)×(# of selected products), where each algorithm in the library was tested on every product and averaged. The algorithm that performed the best was selected. In this embodiment, DiscreteOnePlusOne was the model that gave the best results. After running the optimization once on the model, the promotions were shuffled to new dates and sales were boosted by about 5-15%, depending the product.

The second phase was the anchoring of certain promotions; i.e. these promotions were not optimized. This was to mimic the situation as if there was human decision making involved (the human gives certain requirements for the promotion dates and the algorithm must optimize with those requirements in mind). The anchoring took place using Plotly Dash for the user interface.

In addition, experimentation was also done on different types of promotions such as in-store displays, flyers, and price discounts. Overall, our approach required a systematic investigation and analysis to test our hypotheses.

Figure 7:
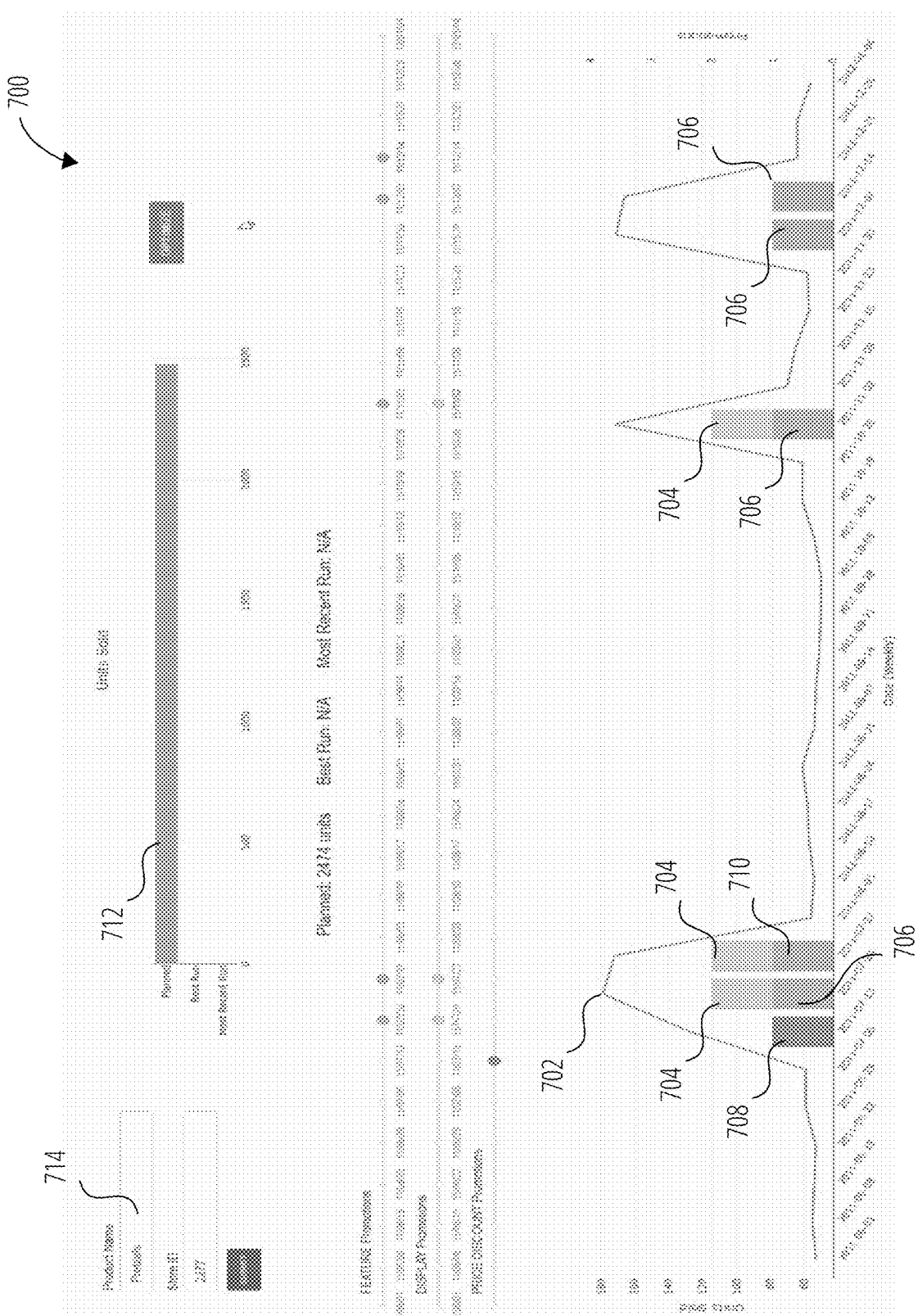
FIG. 7 illustrates a phase 1 of promotion optimization in accordance with one embodiment of interactive machine learning.

FIG. 7 illustrates a phase 1 of promotion optimization 700 in accordance with one embodiment interactive machine learning. In FIG. 7, a machine learning model is used to predict sales of pretzels 714, with different promotions scheduled.

In FIG. 7, there are three types of promotions: a first type of promotion 704 (i.e. display promotions); a second type of promotion 706 (i.e. feature promotions); and a third type of promotion 708 (i.e. price discount promotions), each promotion scheduled as shown. On Jul. 13, 2017, there is one instance of the third type of promotion 708. On Jul. 20, 2011, there is one instance of the first type of promotion 704 and one instance of the second type of promotion 706. On Jul. 27, 2011, there is one instance of the first type of promotion 704 and one instance of the second type of promotion 706. On Nov. 2, 2011, there is one instance of the first type of promotion 704 and one instance of the second type of promotion 706. On Nov. 7, 2011, there is one instance of the second type of promotion 706. On Nov. 14, 2011, there is one instance of the second type of promotion 706. In all, there are three instances of the first type of promotion 704; five instances of the second type of promotion 706; and one instance of the third type of promotion 708. The prediction 712 predicts 2474 units will be sold.

Figure 8:
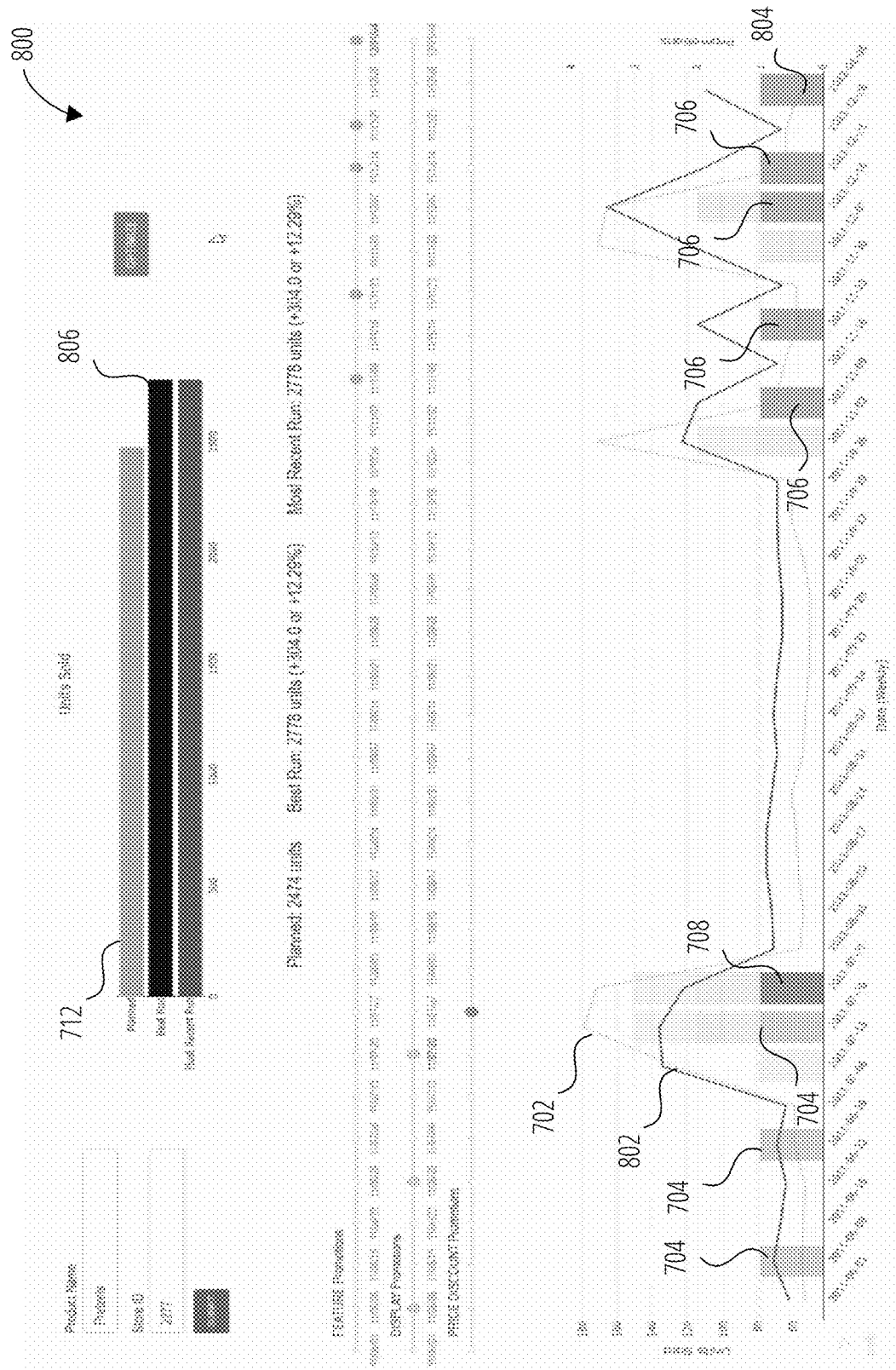
FIG. 8 illustrates an optimized prediction 800 in accordance with the embodiment shown in FIG. 3.

FIG. 8 illustrates an optimized prediction 800 in accordance with the embodiment shown in FIG. 7.

In FIG. 8, the promotions are moved so as to optimize the prediction. Optimized prediction total 802 is shown relative to predicted sales 702 from FIG. 7 (in which the promotions were not optimized).

As a result, the three types of promotions have been moved, such that the optimized prediction 806 predicts a jump in sales to 2778 units—a jump of 304 units or 12.3%, from prediction 712.

Two of the three instances of the first type of promotion 704 have moved to: Jun. 8, 2011 and Jun. 29, 2011 (from original dates of Jul. 27, 2011 and Nov. 2, 2011). Only the one instance of the first type of promotion 704 remains unmoved on Jul. 20, 2011.

Four of the five instances of the second type of promotion 706 have moved to: Nov. 9, 2011; Nov. 23, 2011; Dec. 21, 2011 and Jan. 4, 2012 (from original dates of Jul. 20, 2011; Jul. 27, 2011; Nov. 2, 2011 and Dec. 7, 2011). Only one instance of the second type of promotion 706 has remained unmoved: Dec. 14, 2011. Meanwhile, the only instance of the third type of promotion 708 has moved to Jul. 7, 2011 from its original date of Jul. 13, 2011.

Figure 9:
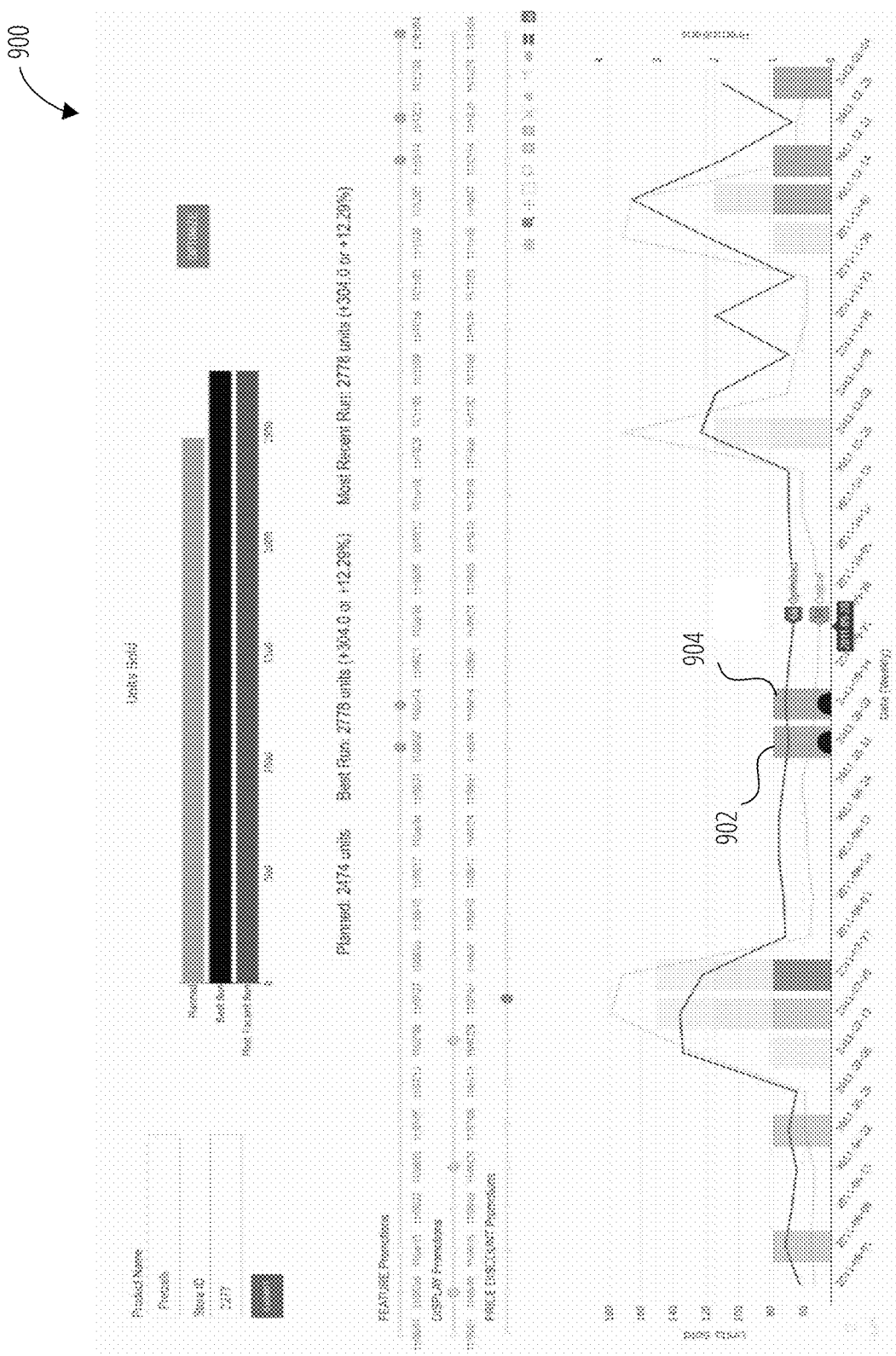
FIG. 9 illustrates an interactive phase of promotion in accordance with the embodiment shown in FIG. 8.

FIG. 9 illustrates an interactive phase of promotion 900 in accordance with the embodiment shown in FIG. 8. In FIG. 9. the user interacts with the machine learning model by fixing one or more of the promotion dates, through a user interface. In this embodiment, the user interface is a graphical user interface, by which the user can move the promotions on the screen. In FIG. 9, the user has fixed two instances of the second type of promotion 706: fixed promotion 902 and fixed promotion 904. each indicated by a black dot. That is, the user has opted not to use the results (shown in FIG. 8) of the fully optimized results, and instead, has decided that there must be a promotion on Sep. 7, 2011 and another promotion on Sep. 14, 2011. The user, however, does not place any constraints on the remaining promotions.

Figure 10:
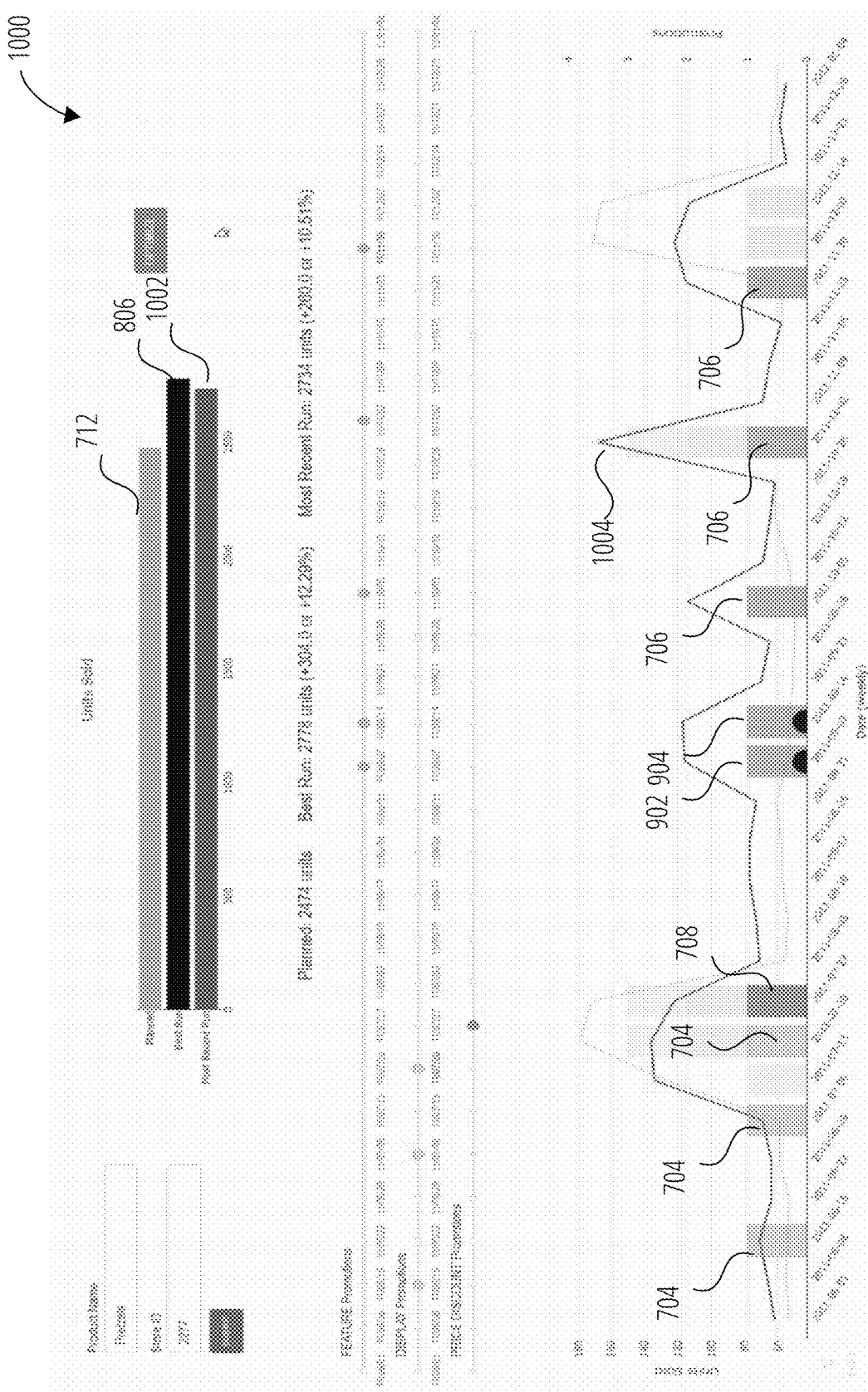
FIG. 10 illustrates a final phase of promotion optimization in accordance with the embodiment shown in FIG. 9.

FIG. 10 illustrates a final phase of promotion optimization 1000 in accordance with the embodiment shown in FIG. 9.

In FIG. 10, with two fixed promotions (fixed promotion 902 and fixed promotion 904), the machine learning model is re-optimized for the remaining promotions. The result is new interactive optimized prediction interactive optimized forecast total 1002. The total units predicted is 2734 units, compared to the original prediction 712 of 2474 units, which is a 10.5% increase. The optimized prediction total 802 (without fixed dates for promotions) is 2778 units.

The new optimized promotion dates (with the exception of fixed promotion 902 and fixed promotion 904) are as follows. The first type of promotion 704 is now slated for Jun. 15, 2011, Jul. 6, 2011 and Jul. 20, 2011. The second type of promotion 706 is now slated for Oct. 5, 2011, Nov. 2, 2011 and Nov. 30, 2011, in addition to the two fixed dates of Sep. 7, 2011 and Sep. 14, 2011.

At this stage, the user can decide whether the slight drop in predicted sales (from 2778 units with no promotion constraints, to 2734 units using two fixed promotion dates), is acceptable. The user can go back and play with other fixed dates 9i.e move around the fixed dates) and see how the machine learning model predicts sales, based on the user's requirements.

Embodiment: Machine Learning (Clustering)

Figure 11:
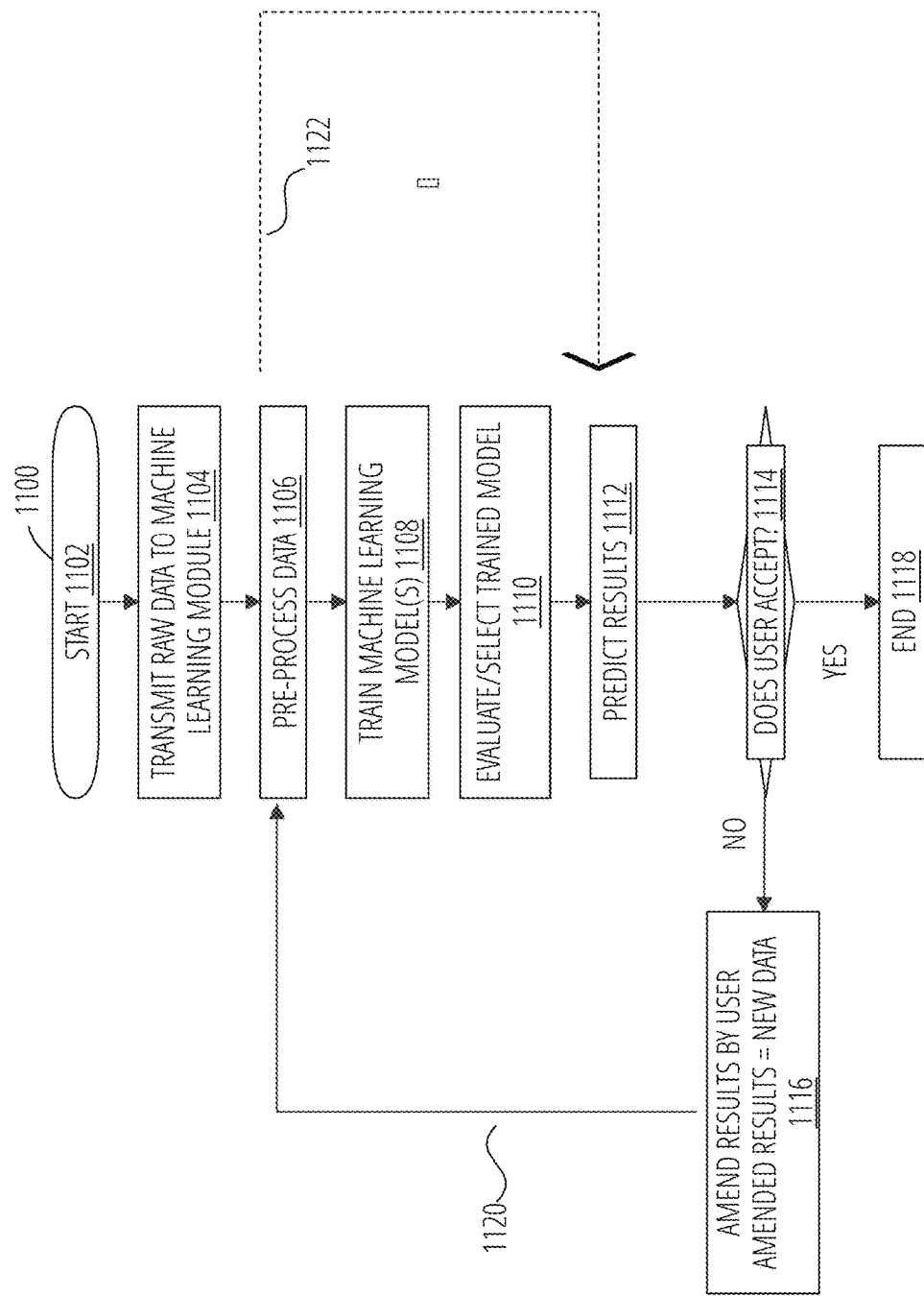
FIG. 11 illustrates a block diagram in accordance with one embodiment of interactive machine learning.

FIG. 11 illustrates a block diagram 1100 in accordance with one embodiment of interactive machine learning.

Raw data is first transmitted to a machine learning module at step 1104, The data is pre-processed at step 1106, after which it is sent to train one or more machine learning models at step 1108. Each trained model is evaluated, and a trained model is selected at step 1110 to make predictions. The trained model is used predict results at step 1112.

At this juncture, the results are presented to a user, who has the option to amend the predicted results at step 1116. The amended results are then used as new or updated data, and loop 1120 (composed of step 1106-step 1108-step 1110-step 1112) is executed. Loop 1120 can be executed as many times as needed until the user is satisfied with the results, and the process ends at step 1118.

Alternatively, loop 1122 can be used after pre-processing the data at step 1106. Loop 1122 simply retrains the selected model, rather than training and evaluating machine learning models (step 1108 and step 1110). The re-trained model is used to predict new results at step 1112.

Embodiment: Interactive Machine Learning in New Product Introduction

New product introduction is a very large problem in many industries as well as supply chain management and demand forecasting. This problem is universally applicable to any organization that deals with selling or buying products.

In some embodiments, existing items are grouped based on similarity of meaning using an unsupervised machine learning approach initially. As a new item is introduced, it is automatically either 1) added to the cluster it resembles the most; or 2) when it is completely different from any of the existing items, the machine-learning model creates a separate cluster from the new item. The problem with these partitions obtained from clustering of items is that they may be far from the preference of a user. The present disclosure provides system and methods that allows a user to move desired items which influence the positions of all items added after it. To implement such a scenario, the model can be retrained after every user interaction to capture user feedback and allow the model to learn from the feedback.

In some embodiments, this can be achieved by first converting the descriptions/names of items into word vectors of multiple dimensions (in some embodiments, 300 dimensions). These items can be shown to a user on user interface (in some embodiments, the user interface is a GUI) by projecting them onto the 2D plane. A neural network can be trained on the word vectors and their predicted 2D coordinates; and subsequently use this to predict the locations of the items that were shown on the user interface. Whenever a change is made to the predicted results shown on the user interface, the neural network is retrained on the feedback which then generates results that are acceptable to the user.

Experimental Details (New Product Introduction)

A search was made to decide which model or algorithm can allow for both clustering existing items (given system constraints) and retraining of the model on user input without changing the coordinates of exiting items on a graph. This required some experimentation on different types of techniques for dimensionality reduction such as t-Distributed Stochastic Neighbor Embedding (t-SNE) and Principal Component Analysis (PCA), clustering algorithms like K-Means, Fuzzy K-Means and Denclue, correlation algorithms like Spearman's rank-order, Pearson correlation coefficient and Cramer's V statistic. Another uncertainty was whether moving one or more items would produce enough information to meaningfully retrain the model to produce desirable results.

Many approaches and hypotheses were evaluated. It was first hypothesized that it was possible to cluster existing items with a right set of algorithms. A few algorithms were created and tested to allow for meaningful retraining of the machine learning model to allow the model to learn from user feedback.

A publicly-available data set was used to experiment on. Second, a model was built for similarity prediction of the products. Then another model was built for the projection of the products from a higher dimension to a 2-dimensional screen to be able to visualize the clustered products that would be able to learn from user interactions—such as moving products (changing coordinates) and adding new products. An optimal set of model hyper-parameters was found, as well as the best algorithm for capturing and learning from user feedback. This allowed for the creation of a model that can effectively learn from non-labelled user feedback to better classify products.

Word2Vec was first selected for learning the similarity of words in the English language to create a similarity matrix of the products from the dataset. A neural network called Multi-Layer Perceptron (MLP) Regresssor was then fit on the word vectors and the 2D projection output from t-SNE. The description/names of the products were treated as features of the model (input). The goal is to classify products correctly according to their semantic meaning and allow the user to override this prediction in a way that the model will learn from.

All the products were selected from the dataset. A pretrained Word2Vec model was executed on all the product descriptions to find out their word vectors. These word vectors were projected onto the 2D plane using t-SNE. This prediction was learned using a neural network which is used to re-train whenever a product is moved to a different location or a new product is added by the user. Hence, the neural network learns from human interaction and makes better predictions over time.

Figure 12:
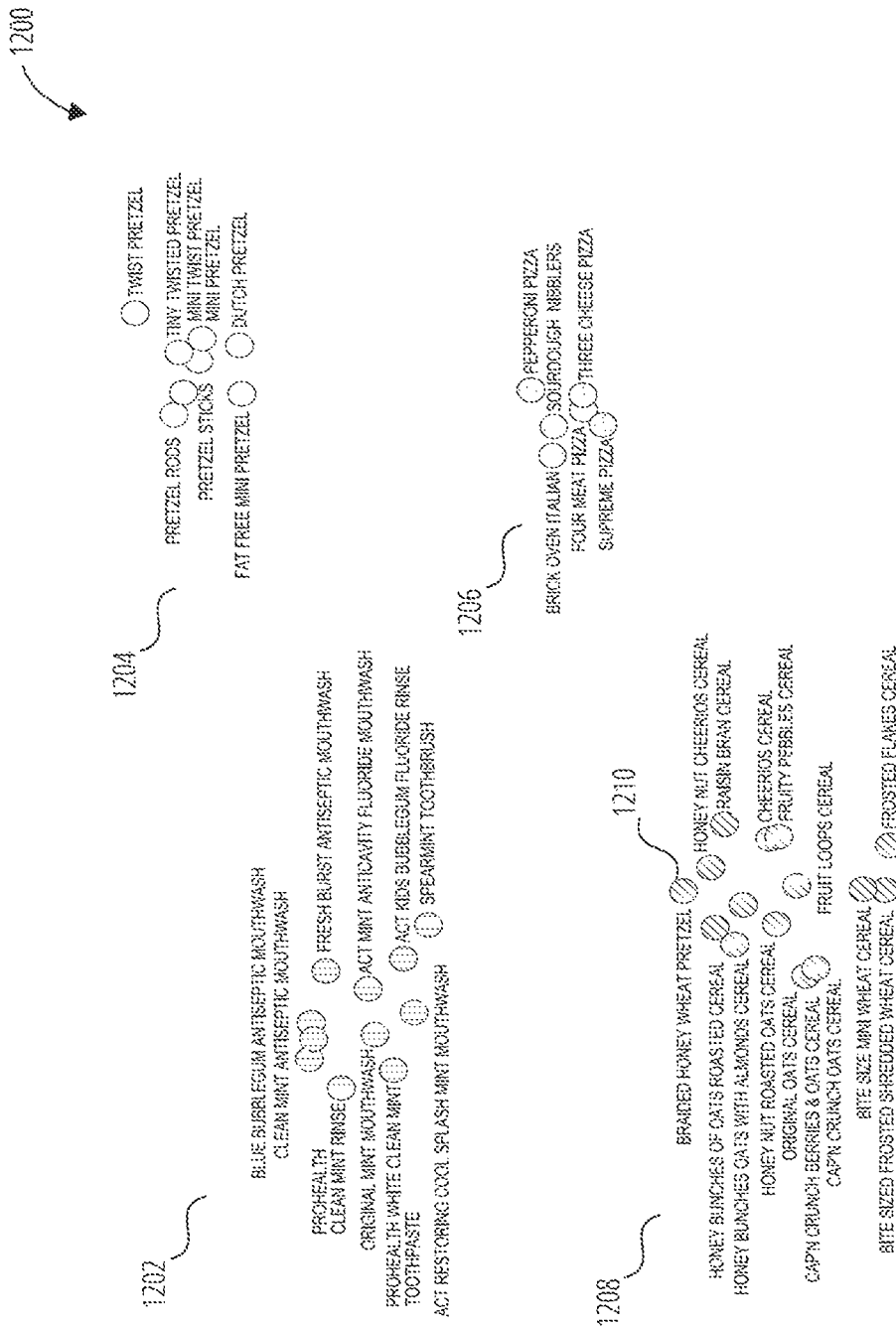
FIG. 12 illustrates a diagram of cluster groupings in accordance with one embodiment of interactive machine learning.

FIG. 12 illustrates a diagram of cluster groupings 1200 in accordance with one embodiment of interactive machine learning.

In FIG. 12, a series of items (characterized by words or phrases) have been grouped into roughly four clusters by a machine learning program. Cluster 1 1202 corresponds to oral hygiene products; cluster 2 1204 corresponds to pretzel-related products; cluster 3 1206 corresponds to pizza-related products; and cluster 4 1208 corresponds to cereal-related products. A user notes that "braided honey wheat pretzel" (item 1210) has been grouped with cluster 4 1208 by the machine learning program. The user believes this is an incorrect placement.

FIG. 12 illustrates the diagram of cluster groupings 1200 of FIG. 12 after moving item 1210 (the "braided honey wheat pretzel" from cluster 4 1208 (cereal-related products) to cluster 2 1204 (pretzel-related products). In doing so, the use has retrained the machine-learning model with the modified data set in which braided honey-wheat pretzels are classified with the pretzel-related group, and not the cereal-related group.

Figure 13:
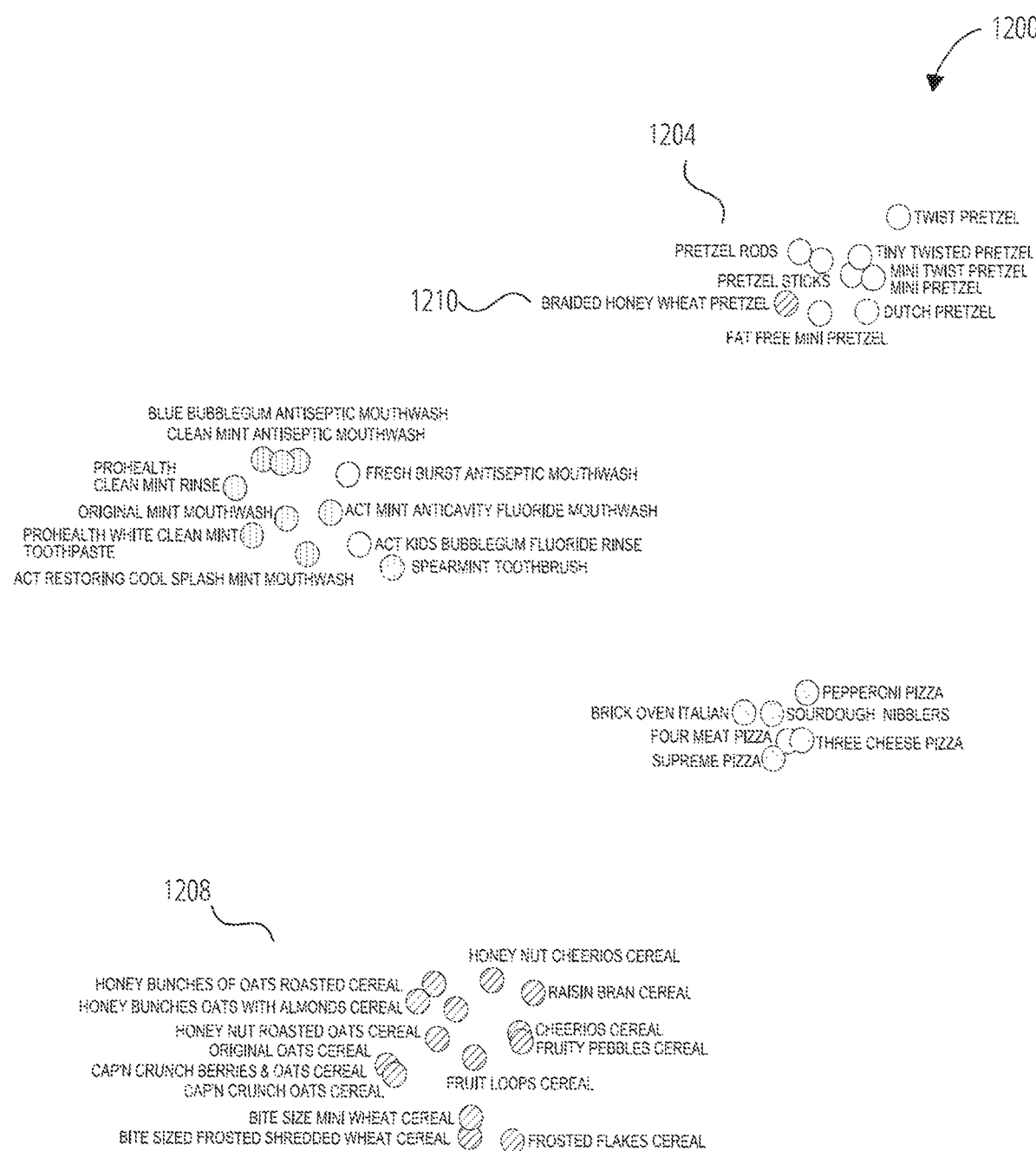
FIG. 13 illustrates the diagram of cluster groupings of FIG. 12 after moving an element.

FIG. 13 thus illustrates interactive machine learning that is used to retrain machine learning model.

Figure 14:
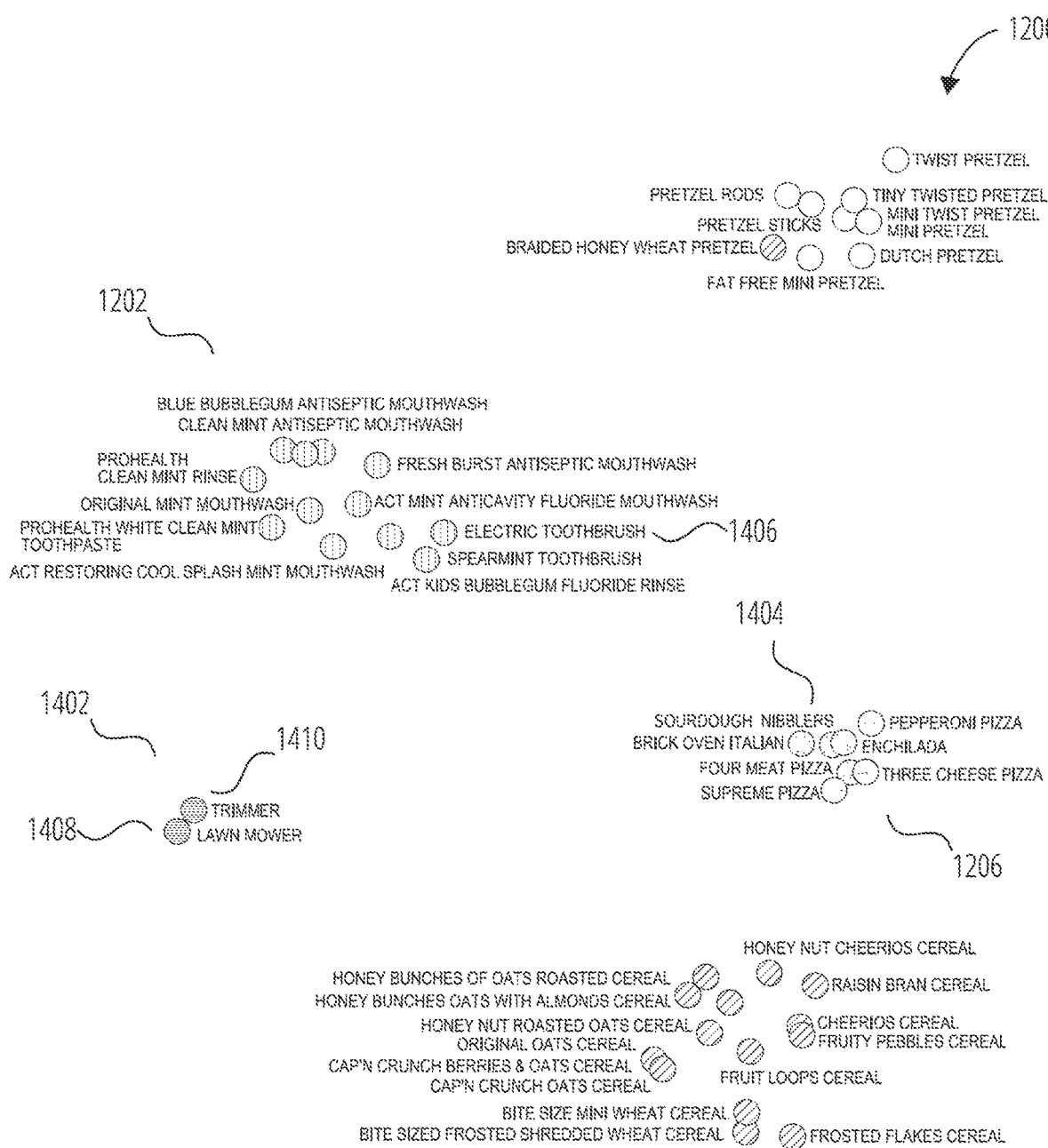
FIG. 14 illustrates a diagram of cluster groupings of FIG. 13 after adding new elements.

FIG. 14 illustrates a diagram of cluster groupings 1200 of FIG. 13 after adding a number of new elements.

For example, the new term "electric toothbrush" (item 1406) is added to cluster 1 1202 (oral-hygiene related products) by the machine learning program. The new term "enchilada" (item 1404) is added to cluster 3 1206 (pizza-related products) by the machine learning program. However, the two terms "lawn mower" (item 1408) and "grass trimmer" (item 1410) have been placed into a new cluster 5 1402 by the machine learning model. Addition of new items in interactive machine learning does not really entail any influence on the machine learning process by the user.

Figure 15:
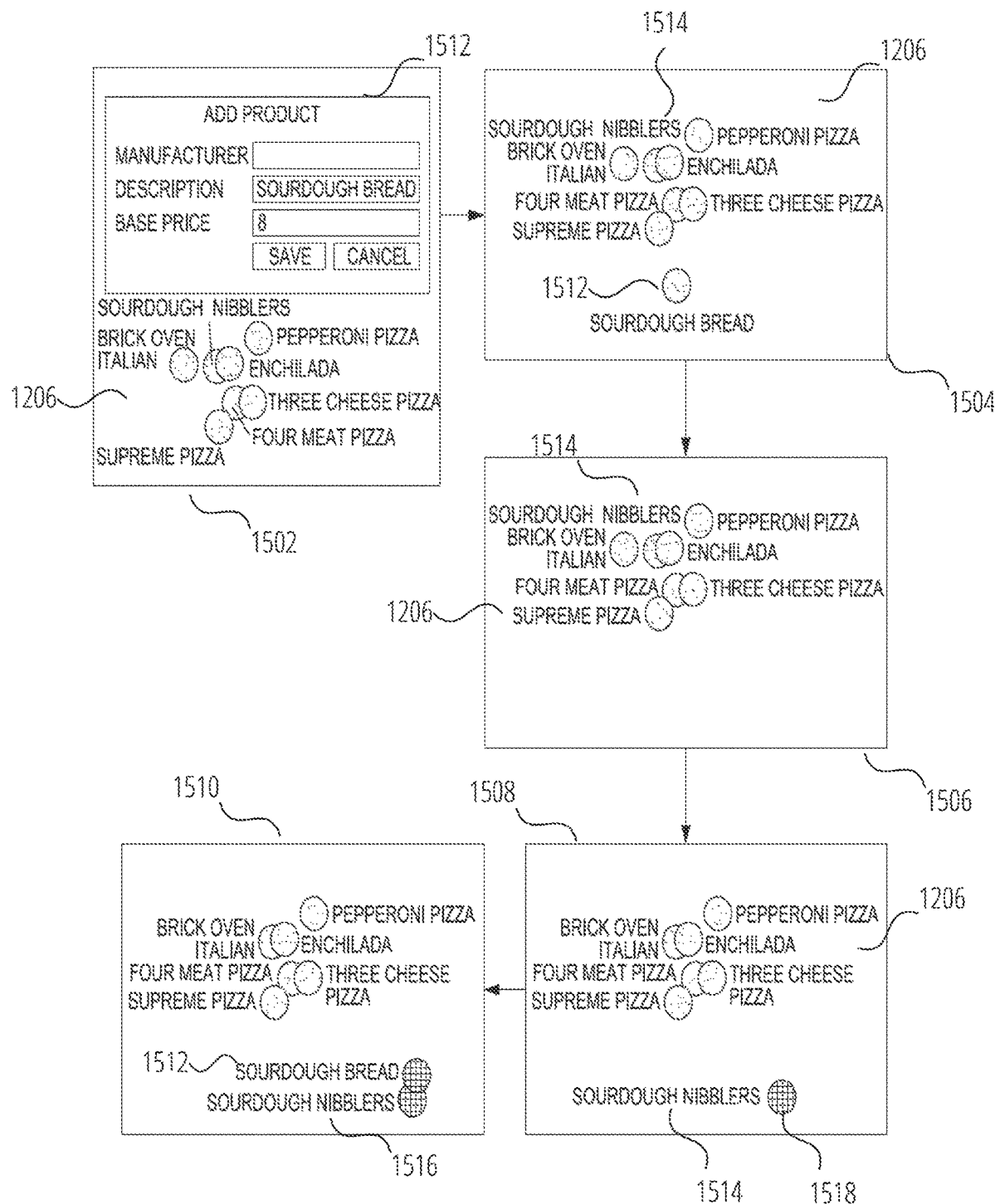
FIG. 15 illustrates a series of diagrams of cluster groupings after adding, moving, and adding an element in accordance with one embodiment of interactive machine learning.

FIG. 15 illustrates a series of diagrams of cluster groupings after adding, moving, and adding an element in accordance with one embodiment of interactive machine learning.

FIG. 15 provides a closeup of cluster 3 1206 (pizza-related products) from FIG. 12, through a series of changes, which are described as follows.

In snapshot 1502, a new item 1512 ("sourdough bread") is input to the machine-learning model, which places it in cluster 3 1206, as shown in snapshot 1504. The user notes that item 1514 ("sourdough nibblers") is closely related to item 1512 ("sourdough bread") and decides that these two items should form their own distinct group. That is, the user wishes to override the machine learning classification as shown in snapshot 1504.

To do so, the user deletes the newly added item 1512 ("sourdough bread"), as shown in snapshot 1506. The user then moves item 1514 ("sourdough nibblers") from the original cluster 3 1206 (pizza-related products) to its own cluster 6 1518, as shown in snapshot 1508. At this juncture, user interaction retrains the machine learning model to create new cluster 6 1518.

The user then adds item 1512 ("sourdough bread"), which is then placed by the machine learning model, to cluster 6 1518 (sourdough-related products), alongside item 1516 ("sourdough nibblers"), as shown in snapshot 1510.

Thus, FIG. 15 illustrates interactive machine learning.

Figure 16:
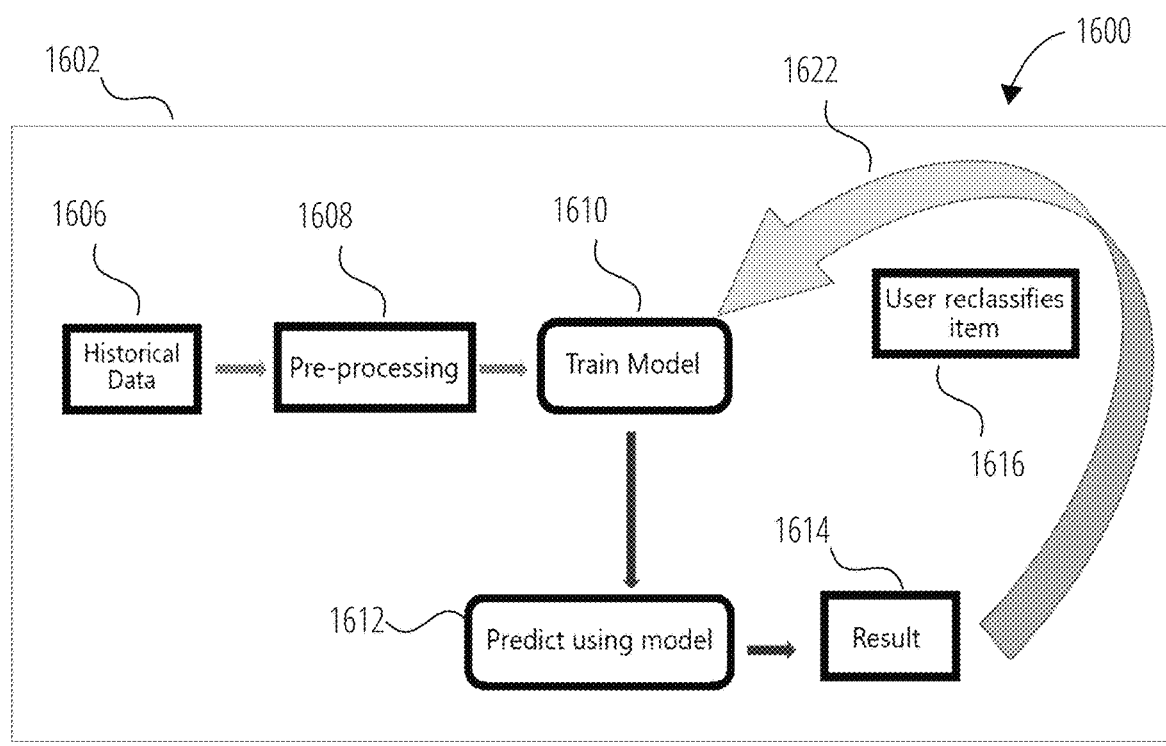
FIG. 16 illustrates flowcharts in accordance with one embodiment of interactive machine learning.
Figure 16:
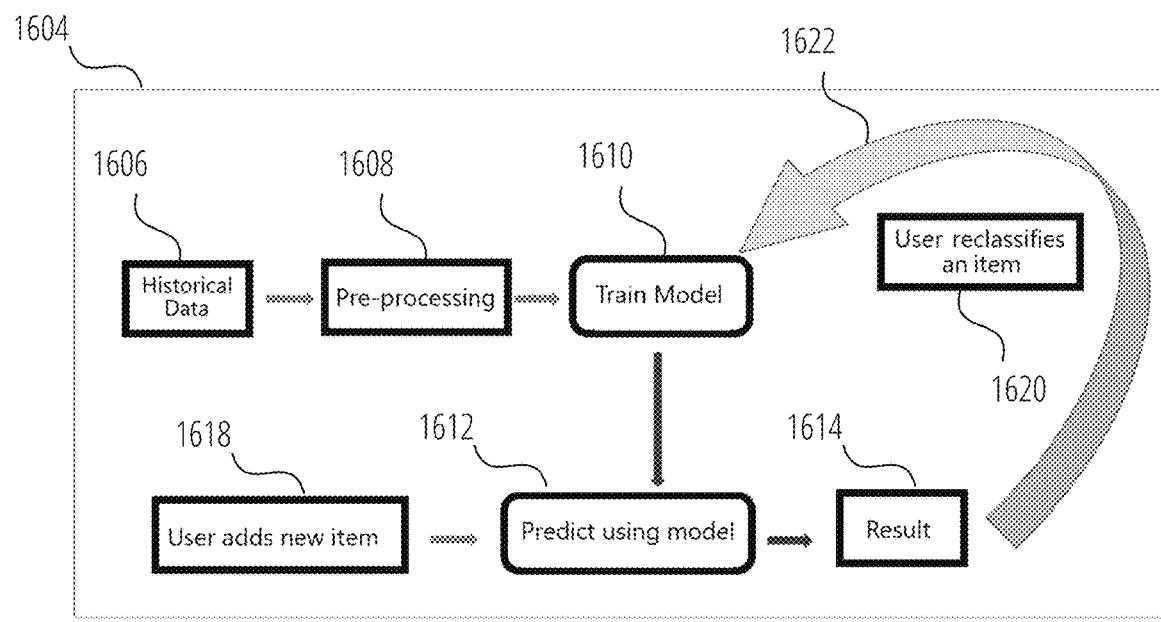

FIG. 16 illustrates flowcharts 1600 in accordance with an embodiment of interactive machine learning.

In particular, the embodiment shown in FIG. 16, illustrates flowcharts 1600 used in the examples of clustering with user interaction shown in FIG. 12-FIG. 15.

In particular, block 1602 illustrates a case where a machine learning model is trained, provides a result of clusters, and then a user interacts with the results by moving an entity in one cluster to a different or altogether new cluster. This process comprises the following steps: historical data 1606 undergoes pre-processing 1608, which is then used to train 1610 a machine learning model. The trained model makes a prediction 1612 and provides result 1614 of clusters to a user. This, for example, can describe the process used to obtain the cluster of groups shown in FIG. 12.

At this point, the user may not agree with the clustering of items provided by the machine learning model and can "move" (i.e. re-classify) one or more items to a different cluster, or begin a new cluster. When an item undergoes reclassification 1616, due to interaction by the user, the trained model is re-trained (arrow 1622) to reflect the new classification of the "moved" item.

Block 1602 describes, for example, the transition in going from the classifications shown in FIG. 12 to the classifications shown in FIG. 13. In both figures, the same number of items are classified. In FIG. 12, the result (i.e. Result 1614) indicates that item 1210 ("braided honey wheat pretzel") is placed in cluster 4 1208, which groups together honey-related items. However, the user, not satisfied with the placement of item 1210, decides that item 1210 is better placed in cluster 2 1204, which groups pretzel-related items. The user moves item 1210 ("braided honey wheat pretzel") to cluster 2 1204, as shown in FIG. 13. This reclassification of item 1210 retrains the machine learning model, prior to the next execution of the machine learning model. This is shown in block 1602 by arrow 1622, as reclassification 1616.

Block 1604 illustrates a case where a machine learning model is trained and provides classification results. Subsequently, one or more new items are added; their classification is based on the trained model. A new item may be added, by the trained model, to either a pre-existing cluster, or, may become part of a newly-defined cluster. Once a new item is added and placed in a cluster by the trained model, the user may interact with the results by moving an item in one cluster to a different or altogether to a new cluster.

The process in block 1604 comprises the following steps: historical data 1606 undergoes pre-processing 1608, which is then used to train 1610 a machine learning model. The trained model makes a prediction 1612 and provides result 1614 of clusters to a user. The user then adds a new item 1618; its placement is provided by prediction 1612, which is shown in result 1614. At this point, the user may not agree with result 1614, and may choose to move an item to a different cluster, or an altogether new cluster. At this point reclassification 1620 occurs (arrow 1622) and the model is retrained.

For example, the situation shown in FIG. 14 can be described by the steps of block 1604. After the initial clustering of groups (shown in FIG. 12), followed by the movement of item 1210 to cluster 2 1204 (in FIG. 13). This move, or interaction, provides a re-classification of item 1210, which retrains the model. In FIG. 14, new item 1404 is added, and placed in cluster 3 1206 by the once-retrained model. Next, item 1406 is added and place in cluster 1 1202 by the once-retrained model. Subsequently, new item 1408 is added and placed in new cluster 5 1402 by the once-retrained model. Finally, new item 1410 is added, and placed in new cluster 5 1402 by the once-retrained model. The sequence of events does not involve any movement (or re-classification) of items by the user. The situation shown in FIG. 14 is simple prediction of the classification of new items, based on a trained model—i.e., the sequence of: adding new item 1618, prediction 1612 of new item 1618, followed by result 1614.

Returning to block 1604, once the classification of a new item is predicted (prediction 1612), the user may not agree with the classification results after the placement of the new item. As in block 1602, the user can "move" (i.e. re-classify) one or more items to a different cluster, or begin a new cluster. In some embodiments, the user may choose to move the new item to a different cluster—one that may already exist, or create a new cluster grouping altogether. In some embodiments, the user may choose to move (or re-classify) an item that has been previously classified (i.e. not the new item), while maintaining the classification of the newly classified item. When an item undergoes reclassification 1620, due to interaction by the user, the trained model is re-trained (arrow 1622) to reflect the new classification of the "moved" item.

Block 1604 describes, for example, the transitions shown in FIG. 15. In snapshot 1502, a new item 1512 ("sourdough bread") is input to the machine-learning model, which places it in cluster 3 1206, as shown in snapshot 1504. This is a simple prediction (prediction 1612) by the trained model after new item 1618 is input. The user notes that item 1514 ("sourdough nibblers") is closely related to item 1512 ("sourdough bread") and decides that these two items should form their own distinct group. That is, the user wishes to override the machine learning classification as shown in snapshot 1504.

To do so, the user deletes the newly added item 1512 ("sourdough bread"), as shown in snapshot 1506. The user then moves item 1514 ("sourdough nibblers") from the original cluster 3 1206 (pizza-related products) to its own cluster 6 1518, as shown in snapshot 1508. At this juncture, user interaction retrains the machine learning model to create new cluster 6 1518. That is, the user reclassifies item 1514 (corresponding to reclassification 1620 in block 1604), thus leading to the retraining of the model (arrow 1622).

The user then inserts item 1512 ("sourdough bread"), which is then placed by the retrained machine learning model, in cluster 6 1518 (sourdough-related products), alongside item 1516 ("sourdough nibblers"), as shown in snapshot 1510. This result 1614, deemed satisfactory by the user, remains as is (i.e. this placement does not undergo reclassification 1620).

Figure 17:
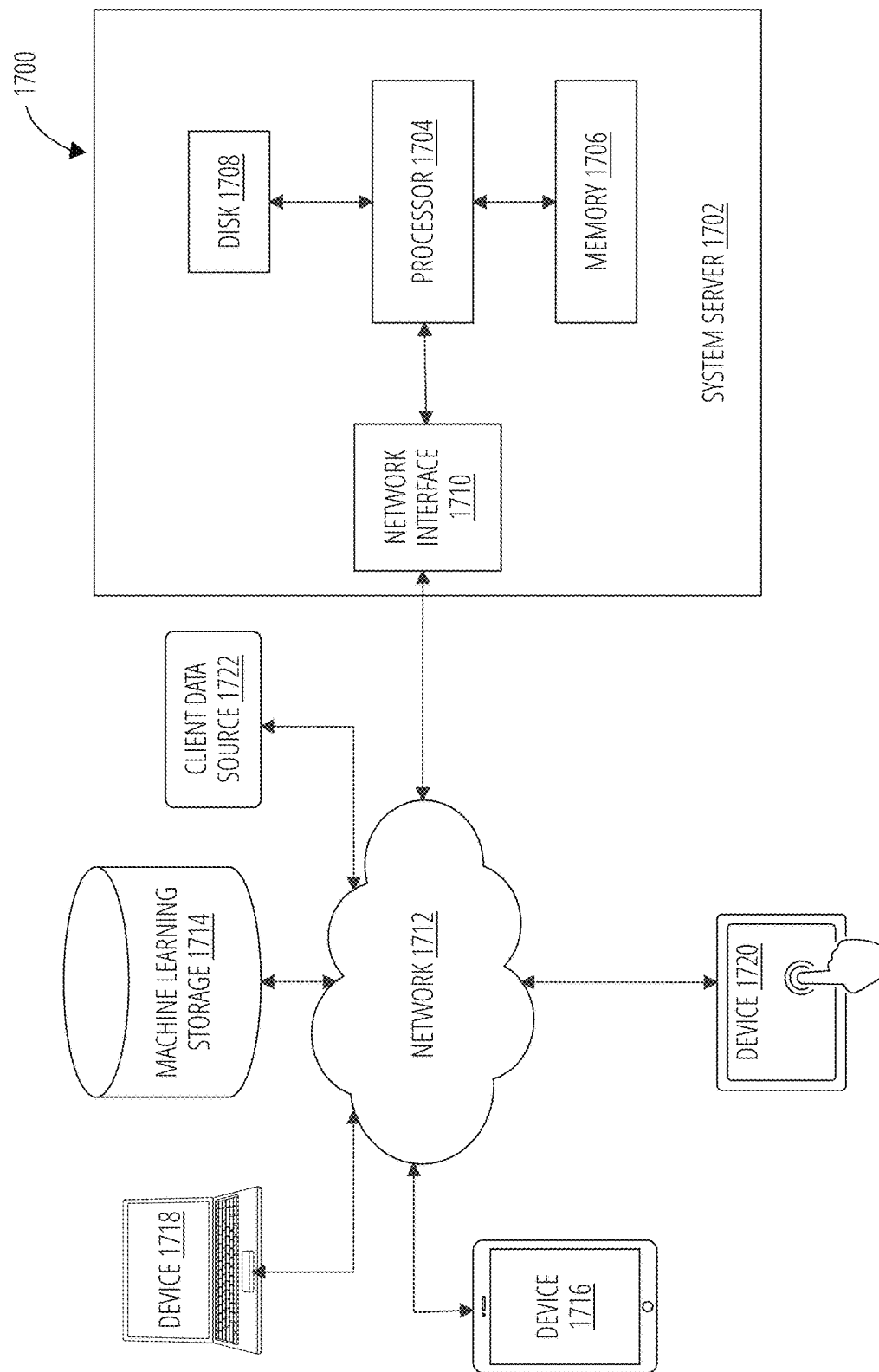
FIG. 17 illustrates a system in accordance with one embodiment of interactive machine learning.

FIG. 17 illustrates a system 1700 in accordance with one embodiment of interactive machine learning.

System 1700 includes a system server 1702, machine learning storage 1714, client data source 1722 and one or more devices 1718, 1716 and 1720. System server 1702 can include a memory 1706, a disk 1708, a processor 1704 and a network interface 1710. While one processor 1704 is shown, the system server 1702 can comprise one or more processors. In some embodiments, memory 1706 can be volatile memory, compared with disk 1708 which can be non-volatile memory. In some embodiments, system server 1702 can communicate with machine learning storage 1714, client data source 1722 and one or more external devices 1716, 1718 and 1720 via network 1712. While machine learning storage 1714 is illustrated as separate from system server 1702, machine learning storage 1714 can also be integrated into system server 1702, either as a separate component within system server 1702 or as part of at least one of memory 1706 and disk 1708.

System 1700 can also include additional features and/or functionality. For example, system 1700 can also include additional storage (removable and/or non-removable) including, but not limited to, magnetic or optical disks or tape. Such additional storage is illustrated in FIG. 17 by memory 1706 and disk 1708. Storage media can include volatile and nonvolatile, removable and non-removable media implemented in any method or technology for storage of information such as computer-readable instructions, data structures, program modules or other data. Memory 1706 and disk 1708 are examples of non-transitory computer-readable storage media. Non-transitory computer-readable media also includes, but is not limited to, Random Access Memory (RAM), Read-Only Memory (ROM), Electrically Erasable Programmable Read-Only Memory (EEPROM), flash memory and/or other memory technology, Compact Disc Read-Only Memory (CD-ROM), digital versatile discs (DVD), and/or other optical storage, magnetic cassettes, magnetic tape, magnetic disk storage or other magnetic storage devices, and/or any other medium which can be used to store the desired information and which can be accessed by system 1700. Any such non-transitory computer-readable storage media can be part of system 1700.

Communication between system server 1702, machine learning storage 1714 and one or more external devices 1716, 1718 and 1720 via network 1712 can be over various network types. In some embodiments, the processor 1704 may be disposed in communication with network 1712 via a network interface 1710. The network interface 1710 may communicate with the network 1712. The network interface 1710 may employ connection protocols including, without limitation, direct connect, Ethernet (e.g., twisted pair 10/40/400 Base T), transmission control protocol/internet protocol (TCP/IP), token ring, IEEE 802.11a/b/g/n/x, etc. Non-limiting example network types can include Fibre Channel, small computer system interface (SCSI), Bluetooth, Ethernet, Wi-fi, Infrared Data Association (IrDA), Local area networks (LAN), Wireless Local area networks (WLAN), wide area networks (WAN) such as the Internet, serial, and universal serial bus (USB). Generally, communication between various components of system 1700 may take place over hard-wired, cellular, Wi-Fi or Bluetooth networked components or the like. In some embodiments, one or more electronic devices of system 1700 may include cloud-based features, such as cloud-based memory storage.

Machine learning storage 1714 may implement an "in-memory" database, in which volatile (e.g., non-disk-based) storage (e.g., Random Access Memory) is used both for cache memory and for storing the full database during operation, and persistent storage (e.g., one or more fixed disks) is used for offline persistency and maintenance of database snapshots. Alternatively, volatile storage may be used as cache memory for storing recently-used data, while persistent storage stores the full database.

Machine learning storage 1714 may store metadata regarding the structure, relationships and meaning of data. This information may include data defining the schema of database tables stored within the data. A database table schema may specify the name of the database table, columns of the database table, the data type associated with each column, and other information associated with the database table. Machine learning storage 1714 may also or alternatively support multi-tenancy by providing multiple logical database systems which are programmatically isolated from one another. Moreover, the data may be indexed and/or selectively replicated in an index to allow fast searching and retrieval thereof. In addition, machine learning storage 1714 can store a number of machine learning models that are accessed by the system server 1702. A number of ML models can be used.

In some embodiments where machine learning is used, gradient-boosted trees, ensemble of trees and support vector regression, can be used. In some embodiments of machine learning, one or more clustering algorithms can be used. Non-limiting examples include hierarchical clustering, k-means, mixture models, density-based spatial clustering of applications with noise and ordering points to identify the clustering structure.

In some embodiments of machine learning, one or more anomaly detection algorithms can be used. Non-limiting examples include local outlier factor.

In some embodiments of machine learning, neural networks can be used.

Client data source 1722 may provide a variety of raw data from a user, including, but not limited to: point of sales data that indicates the sales record of all of the client's products at every location; the inventory history of all of the client's products at every location; promotional campaign details for all products at all locations, and events that are important/relevant for sales of a client's product at every location.

Using the network interface 1710 and the network 1712, the system server 1702 may communicate with one or more devices 1716, 1718 and 1720. These devices 1716, 1718 and 1720 may include, without limitation, personal computer(s), server(s), various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony Play Station, etc.), or the like.

Using network 1712, system server 1702 can retrieve data from machine learning storage 1714 and client data source 1722. The retrieved data can be saved in memory 1706 or 1708. In some embodiments, system server 1702 also comprise a web server, and can format resources into a format suitable to be displayed on a web browser.

Once a preliminary machine learning result is provided to any of the one or more devices, a user can amend the results, which are re-sent to machine learning storage 1714, for further execution. The results can be amended by either interaction with one or more data files, which are then sent to 1714; or through a user interface at the one or more devices 1716, 1718 and 1720. For example, in 1720, a user can amend the results using a graphical user interface.

Although the algorithms described above including those with reference to the foregoing flow charts have been described separately, it should be understood that any two or more of the algorithms disclosed herein can be combined in any combination. Any of the methods, modules, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well-known manner (e.g., it may be implemented by an application specific integrated circuit (ASIC), a programmable logic device (PLD), a field programmable logic device (FPLD), discrete logic, etc.). Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner and can be used separately or in combination.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system comprising:
    a processor; and
    a memory storing instructions that, when executed by the processor, configure the system to:
        convert a plurality of descriptions of items into a plurality of word vectors, each word vector having a plurality of dimensions;
        project, onto a two-dimensional plane of a user interface, the plurality of word vectors;
        train a neural network on the plurality of word vectors and a plurality of sets of two-dimensional coordinates, each set of two-dimensional coordinates associated with a respective word vector;
        predict a result based on the trained neural network;
        output, to the user interface, a prediction comprising cluster groupings of the plurality of sets of two dimensional coordinates;
        amend, via the user interface and in response to user input, the prediction, to provide an amended prediction, wherein the amending comprises moving on a screen displaying the user interface a subset of the plurality of sets of two-dimensional coordinates from one of the cluster grouping to another one of the cluster groupings or to a new cluster grouping;
        retrain the trained neural network based on the amended prediction, thereby providing a retrained neural network; and
        predict a new result based on the retrained neural network.

2. The system of claim 1, wherein the user interface is a graphical user interface.

3. The system of claim 2, wherein the results are output to a device.

4. The system of claim 1, wherein the amending the prediction comprises amending, in response to user input, a data file associated with the prediction.

5. The system of claim 1 wherein the amending comprises moving on a screen displaying the user interface a subset of the plurality of sets of two-dimensional coordinates from one of the cluster groupings to another one of the cluster groupings.

6. The system of claim 1 wherein the amending comprises moving on a screen displaying the user interface a subset of the plurality of sets of two-dimensional coordinates to a new cluster grouping.

7. The system of claim 1 wherein the neural network is a Multi-Layer Perceptron (MLP) Regressor.

8. A computer-implemented method of interactive machine learning, the method comprising:
    converting a plurality of descriptions of items into a plurality of word vectors, each word vector having a plurality of dimensions;
    projecting, into a two-dimensional plane of a user interface, the plurality of word vectors;
    training a neural network on the plurality of word vectors and a plurality of sets of two-dimensional coordinates, each set of two-dimensional coordinates associated with a respective word vector;
    predicting a result based on the trained neural network;
    outputting to the user interface, a prediction comprising cluster groupings of the plurality of sets of two dimensional coordinates;
    amending, via the user interface and in response to user input, the prediction, to provide an amended prediction, wherein the amending comprises moving on a screen displaying the user interface a subset of the plurality of sets of two-dimensional coordinates from one of the cluster groupings to another one of the cluster groupings or to a new cluster grouping;
    retraining the trained neural network based on the amended prediction, thereby providing a retrained neural network; and
    predicting a new result based on the retrained neural network.

9. The computer-implemented method of claim 8, wherein the user interface is a graphical user interface.

10. The computer-implemented method of claim 9, wherein the results are output to a device.

11. The computer-implemented method of claim 8, wherein the amending the prediction comprises amending, in response to user input, a data file associated with the prediction.

12. The computer-implemented method of claim 8 wherein the amending comprises moving on a screen displaying the user interface a subset of the plurality of sets of two-dimensional coordinates from one of the cluster groupings to another one of the cluster groupings.

13. The computer-implemented method of claim 8 wherein the amending comprises moving on a screen displaying the user interface a subset of the plurality of sets of two-dimensional coordinates to a new cluster grouping.

14. The computer-implemented method of claim 8 wherein the neural network is a Multi-Layer Perceptron (MLP) Regressor.

15. A non-transitory computer-readable storage medium, the computer-readable storage medium including instructions that when executed by a computer, cause the computer to:

- convert a plurality of descriptions of items into a plurality of word vectors, each word vector having a plurality of dimensions;
- project, onto a two-dimensional plane of a user interface, the plurality of word vectors;
- train a neural network on the plurality of word vectors and a plurality of sets of two-dimensional coordinates, each set of two-dimensional coordinates associated with a respective word vector;
- predict a result based on the trained neural network;
- output to the user interface, a prediction comprising cluster groupings of the plurality of sets of two-dimensional coordinates;
- amend, via the user interface and in response to user input, the prediction, to provide an amended prediction, wherein the amending comprises moving on a screen displaying the user interface a subset of the plurality of sets of two-dimensional coordinates from one of the cluster groupings to another one of the cluster groupings or to a new cluster grouping;
- retrain the trained neural network based on the amended prediction, thereby providing a retrained neural network; and
- predict a new result based on the retrained neural network.

16. The computer-readable storage medium of claim 15, wherein the user interface is a graphical user interface.

17. The computer-readable storage medium of claim 16, wherein the results are output to a device.

18. The computer-readable storage medium of claim 15, wherein the amending the prediction comprises amending, in response to user input, a data file associated with the prediction.

19. The non-transitory computer-readable storage medium of claim 15 wherein the amending comprises moving on a screen displaying the user interface a subset of the plurality of sets of two-dimensional coordinates from one of the cluster groupings to another one of the cluster groupings.

20. The non-transitory computer-readable storage medium of claim 15 wherein the amending comprises moving on a screen displaying the user interface a subset of the plurality of sets of two-dimensional coordinates to a new cluster grouping.

21. The non-transitory computer-readable storage medium of claim 15 wherein the neural network is a Multi-Layer Perceptron (MLP) Regressor.

* * * * *